(12) United States Patent
Hayes et al.

(10) Patent No.: US 6,681,676 B2
(45) Date of Patent: Jan. 27, 2004

(54) LINEAR MEDIUM PULLING AND RETRIEVAL SYSTEM

(75) Inventors: Roger D. Hayes, Amarillo, TX (US); Francis C. Forsberg, Boerne, TX (US)

(73) Assignee: Halo Products, LLC, Las Vegas, NV (US)

( * ) Notice: Subject to any disclaimer, the term of this patent is extended or adjusted under 35 U.S.C. 154(b) by 0 days.

(21) Appl. No.: 09/893,224

(22) Filed: Jun. 27, 2001

(65) Prior Publication Data

US 2002/0053278 A1 May 9, 2002

Related U.S. Application Data

(63) Continuation-in-part of application No. 09/432,327, filed on Nov. 2, 1999, now abandoned.
(60) Provisional application No. 60/111,573, filed on Dec. 9, 1998.

(51) Int. Cl.[7] .................................................. F41B 7/04
(52) U.S. Cl. ........................................... 89/1.34; 42/51
(58) Field of Search ................................ 89/1.34; 42/51

(56) References Cited

U.S. PATENT DOCUMENTS

| | | | | | |
|---|---|---|---|---|---|
| 2,667,814 A | * | 2/1954 | Blackmon | ................... | 89/1.34 |
| 3,577,949 A | * | 5/1971 | Mueller et al. | .............. | 89/1.34 |
| 3,673,963 A | * | 7/1972 | McGowan | ................... | 89/1.34 |
| 4,741,243 A | * | 5/1988 | Snider | ......................... | 89/1.34 |
| 4,799,906 A | * | 1/1989 | Perkins, Jr. | .................. | 89/1.34 |

* cited by examiner

Primary Examiner—Stephen M. Johnson
(74) Attorney, Agent, or Firm—M. Conrad Huffstutler

(57) ABSTRACT

A generalized, rationally-scaled design is disclosed for a line laying system for use in stringing communications cable across inaccessible spaces. The system includes a tethered projectile which is accurately aimed and launched to a defined target zone by means of a energy-store coupled with a pivoting release lever. The geometric details of placement of the pivot axis of the release lever are disclosed in detail. Specific configurations of the projectile guides and spring support ribs are also disclosed. Implications of design and materials upon accuracy and range are considered and optimal component finishes and tolerances are indicated.

12 Claims, 15 Drawing Sheets

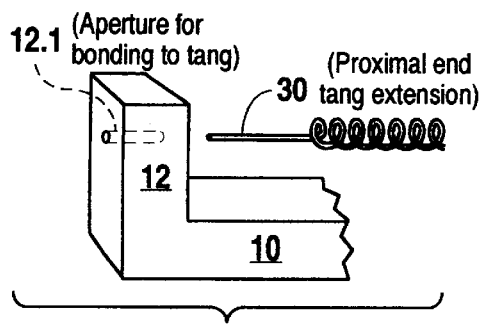
Fig. 2f1
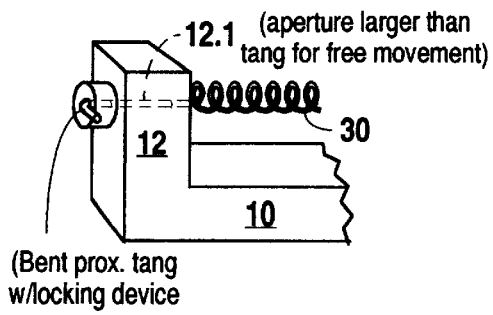
Fig. 2f2
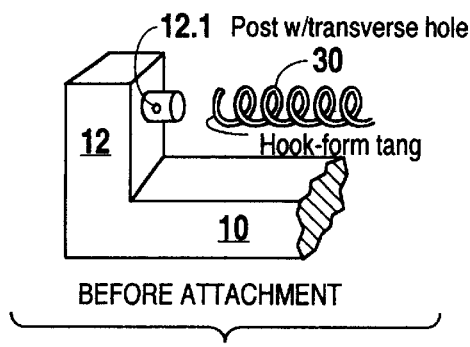
BEFORE ATTACHMENT
Fig. 2f3
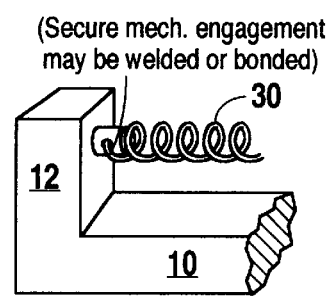
AFTER ENGAGEMENT
Fig. 2f4
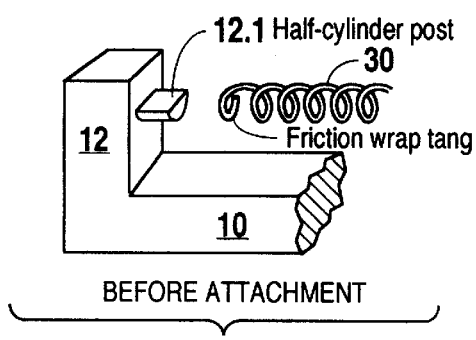
BEFORE ATTACHMENT
Fig. 2f5
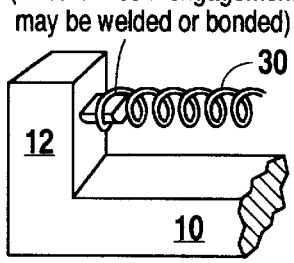
AFTER ENGAGEMENT
Fig. 2f6
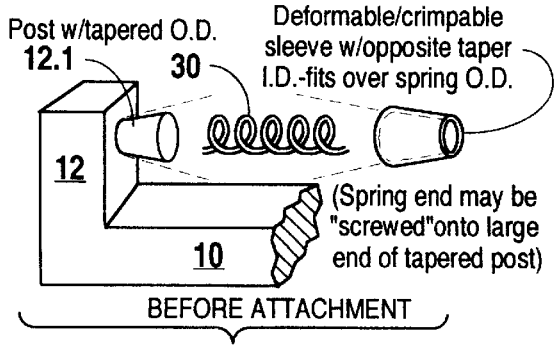
BEFORE ATTACHMENT
Fig. 2f7
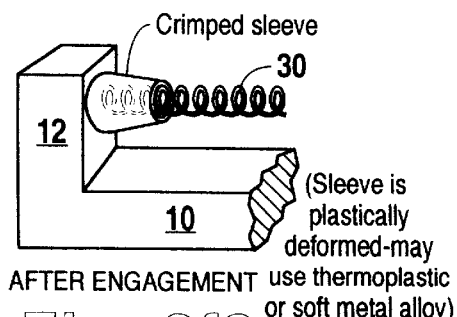
AFTER ENGAGEMENT
Fig. 2f8

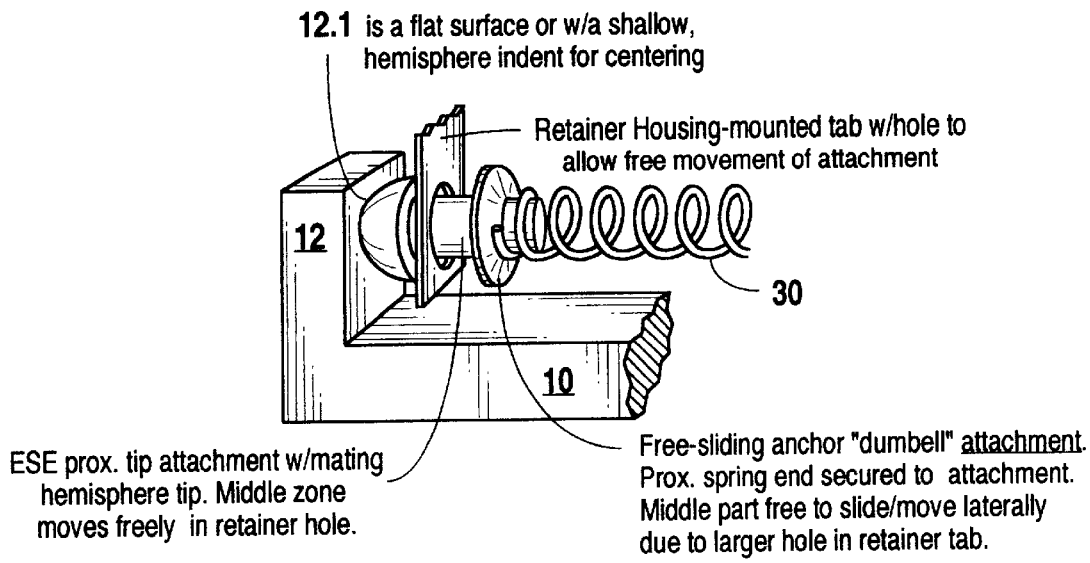
Fig. 2f9
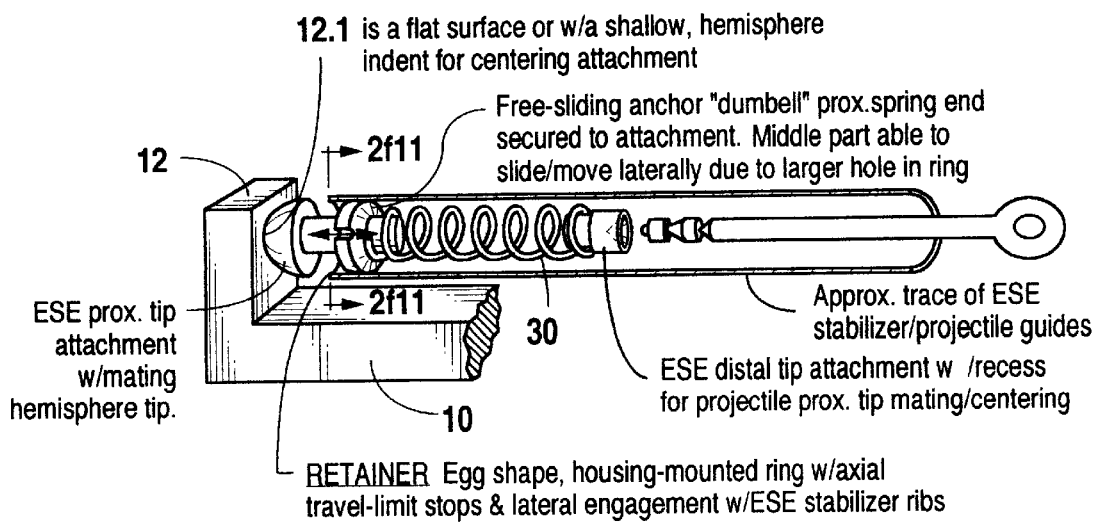
Fig. 2f10
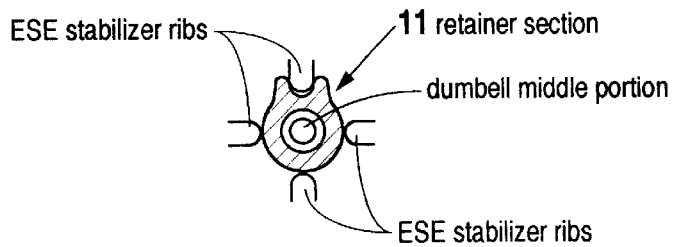
Fig. 2f11

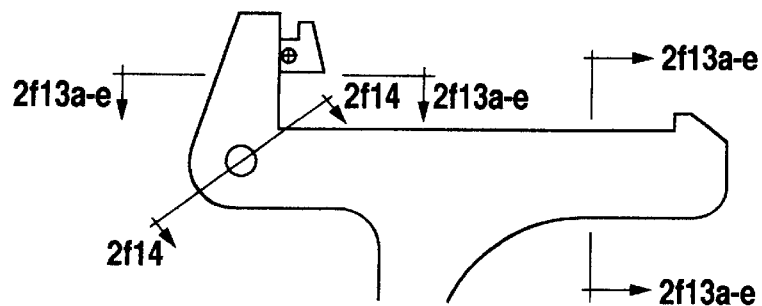
Fig. 2f12
RE SECTIONS
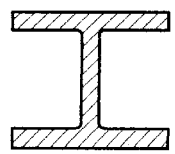
Fig. 2f13a
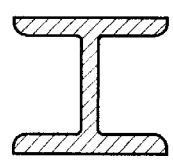
BEAMS
Fig. 2f13b
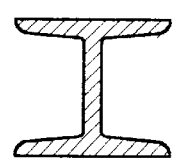
Fig. 2f13c
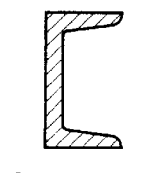
CHANNEL
Fig. 2f13d
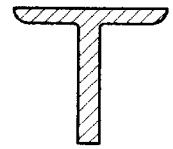
T-BEAM
Fig. 2f13e
RE PIVOT SECTIONS
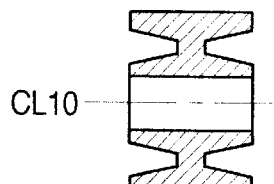
AXLE BOSS
W BEAM
Fig. 2f14a
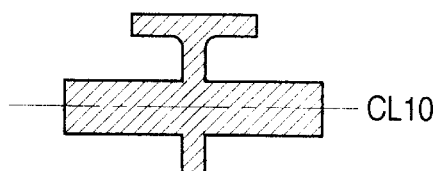
TRUNNION
T-BEAM
Fig. 2f14b

RE PIVOT AXIS POSITION ALTERNATIVES
ZONE 1
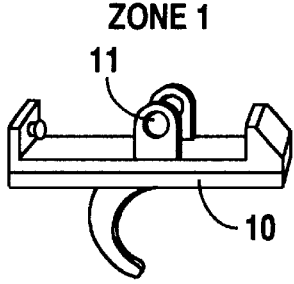
Fig. 2f15a
ZONE 1
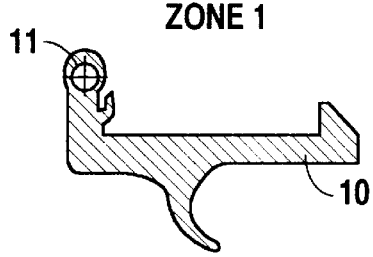
Fig. 2f15b
ZONE 2
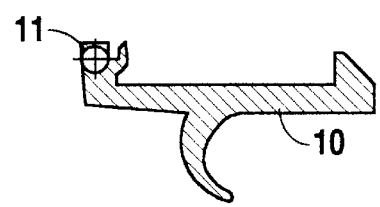
Fig. 2f15c
ZONE 4
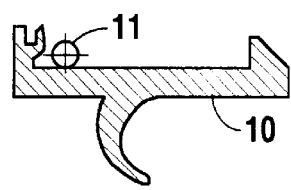
Fig. 2f15d
ZONE 4
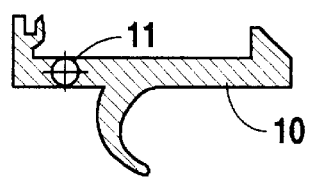
Fig. 2f15e
ZONE 4
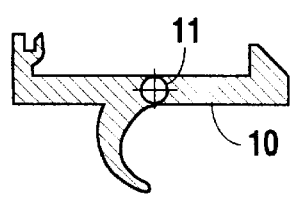
Fig. 2f15f
ZONE 3
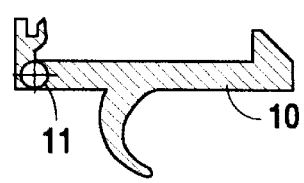
Fig. 2f15g

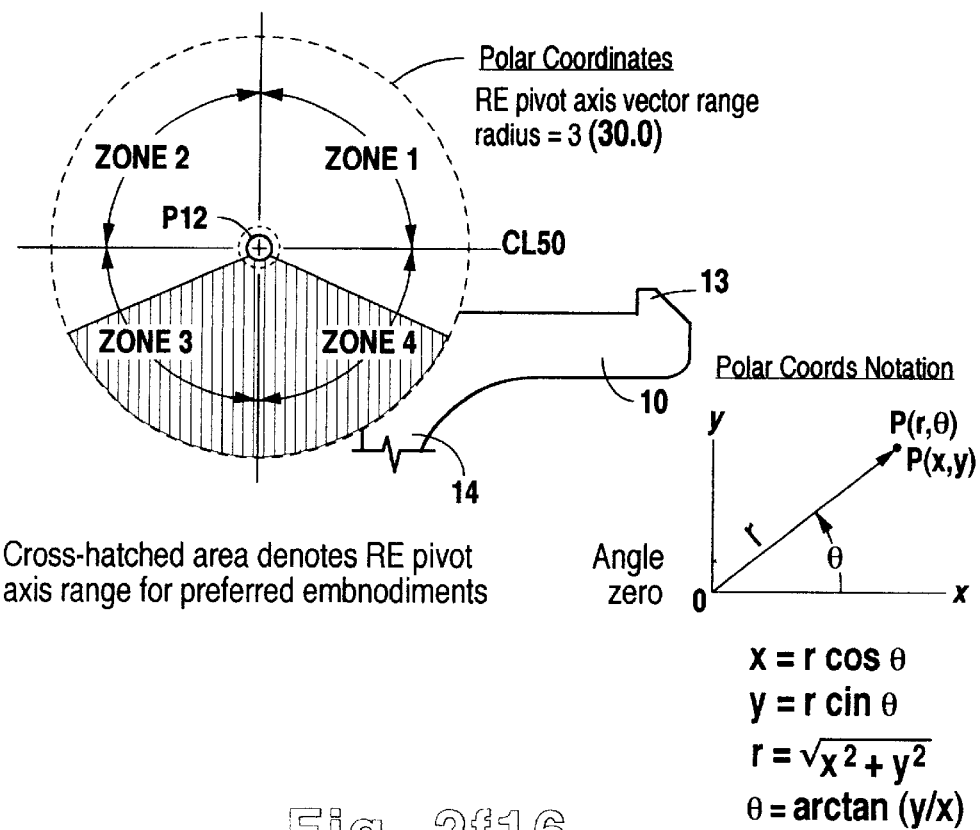
Fig. 2f16
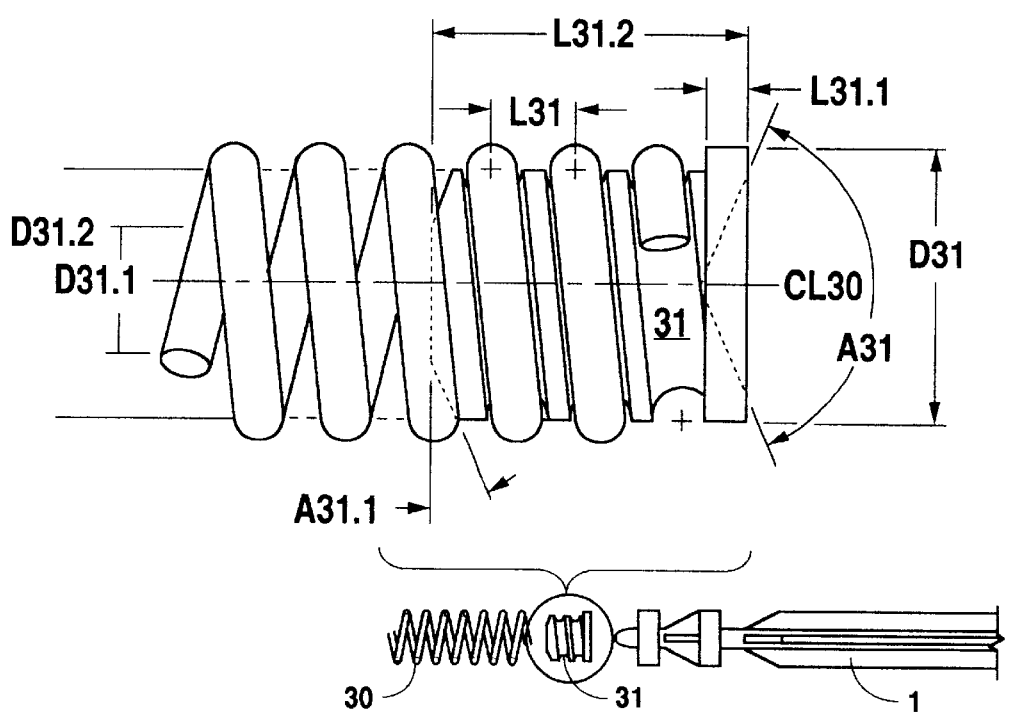
Fig. 2f17

LINEAR MEDIUM PULLING AND RETRIEVAL SYSTEM

CROSS-REFERENCE TO RELATED INVENTIONS

This is a CIP application filed during the pendancy in USPTO of U.S. Utility App: Ser. No. 09/432,327 now abandoned; it claims the priority of the following applications:

U.S. Provisional App: Ser. No. 60/111,573, Filed: Dec. 9, 1998 and now abandoned;

U.S. Utility App: Ser. No. 09/432,327, filed Nov. 2, 1999 and now abandoned;

PCT/US99/29328, int. filing date Dec. 9, 1999 and related foreign filings in DE and GB.

BACKGROUND OF THE INVENTION

This invention relates to a device which enables a mechanic or technician, using an affixed sighting mechanism, to project or "shoot" a small rigid or semi-rigid mechanism or clamping fixture, which is attached to a tether and source of line accurately through a predetermined path towards a source of wire, fiber-optic medium, cabling, or tubing, allowing attachment of such tubing to the clamping fixture and retraction of medium back to the original point of projection.

FIELD OF THE INVENTION

One of the most difficult and undesirable, potentially hazardous, and labor intensive tasks encountered by the electrician, telephone/telecommunications, sound, and other related technicians, is that of the installation of wiring, cabling, telecommunications leads (phone lines), vacuum lines, fiber-optical, and control cabling for such items as heating and air-conditioning, and other like elements forming a contacting mechanism between two or more mechanical, electromechanical, vacuum devices, hereafter described throughout this summation as cabling.

This condition exists in virtually all structures where humans live and work; therefore installation of such cabling is typical and prerequisite to human and machine occupation of these areas. Cable-connected equipment includes such devices as telephones, computers, control sequencing/activation devices for heating & air conditioning, tele-fax machines, security systems, camera systems, garage door (remote) switches, and typically, any and all machines and a myriad of other applications. One could quickly observe that at least multiple of these conditions exist in virtually every room or facility which is constructed. The pace and frequency at which these tasks are being performed increases aggressively with worldwide advances in electronic/computer/telephonic technology. There is a substantial and long-felt need for a device which will relieve the installer from dangerous and time-consuming work of threading cables across ceilings not able to support the weight of a person or efficient pulling machine. The device of the present invention allows the technician to string a pull line accurately, safely and quickly between two points and then to pull cable for control of equipment and systems. The present invention empowers persons who may not be physically capable of getting into such areas to perform the same task in about the same time as another who does not have like limitations. These limitations could include persons with one arm/hand, stiff neck, and like circumstances where the person is mobile but does not have normal reach and limb mobility.

OBJECTS OF THE INVENTION

To provide a mechanism which allows user to point at, with aiming device, and accurately deliver an attachment fixture to a precise locale through a predetermined and precise trajectory. To provide apparatus:

that is light weight in that the combination of all features and components of the device weighs less than 2 kg;

that may be hand-held, allowing users or operator to hold the complete device in one hand;

which is simple in mechanical form and function conducive and appropriate for a wide range of users' competencies;

that is integral in structure whereas all components are integrated and contained within one compact system of components;

in which design is focused upon a specific application, namely laying of wire and cable, not a universal system;

which is compact in size allowing complete system to store in standard means of transporting tools and devices;

complete in form and function, incorporating the mechanical and process components into the proper geometric and ergonomic shapes and sizes conducive and attractive to human use and emotion;

is predictable and consistent in performance, insofar as to enhance users' confidence in the consistency of the performance of the device and system in which a task is performed;

which facilitates two or more selectable, different levels of stored energy in which to propel attachment mechanism and attached tether at selectable ranges of distance;

the power store of which is optimized to provide a long force-distance release profile and to avoid anomalous effect s such as buckling and mechanical oscillations during the release phase;

that is able to propel a tethered projectile and attached tether from the launching device by pulling off from a tether store device;

to provide a design that is desirable to the users and can be manufactured, produced, and obtained by the users, at a retail price level supportive of the trade in which the target user works;

unique in application and process whereby a creative approach and close controls of applicable shapes, materials, and accuracy measures permit significantly shorter completion times for such jobs;

which is self-illuminated when applied or used in areas or environments where there is no inherent source of lighting; and which is ambidextrous whereby selected housing designs facilitates left and right-hand user/operation.

DESCRIPTION OF RELATED ART

Devices and methods for laying cable go back to early days of electricity and telephony. Generally the mechanical devices are compression-spring systems which reflect known design principles common to catapults and siege engines. Even in the most recent inventions one can find no evidence that the inventors have considered and/or properly applied the principles of mechanics and aerodynamics.

U.S. Pat. No. 2,952,091, issued Sep. 13, 1960 to Blanchard, B R (Blanchard-091) discloses a device which uses the gunpowder of a blank cartridge to provide energy for propelling a fishing lure, which consists of several linked elements, toward a target. The specification teaches attachment of the line to the distal or forward tip of the lure which is prepared with a muzzle socket for preventing leakage of propellant gases. FIG. 6 shows the tether reservoir as a reel mounted on a fishing rod which is attached bayonet-style to the barrel of the pistol-like launcher. While the inventor teaches specifics of the size and shape of the lure, re its underwater motions during retrieval, no mention can be found of the motion of the lures in its travel away from the launcher. No teaching about projectile placement accuracy or safety of the launcher can be found on the specification. The distal attachment of the line to the lure and highly-eccentric placement of the reel—offset from the muzzle axis—assures that the lure will tumble uncertainly through the air for an unpredictable distance along some trajectory in the general direction in which the bayonet-like rod was pointing at the moment of firing.

U. S. Pat. No. 5,582,392, issued Dec. 10, 1996 to Bajric, S [assigned to Canus Supply of Mississauga, Ontario/Canada] (Bajric-392) discloses a device for "propelling projectiles". The device includes a tethered rod having a pointed-head "flight" on its distal or forward tip with integral holes for tying the tether cord, a compression power spring connecting between the device body and the proximal or trailing tip of the rod, a body-fixed spring-length-adjustment member, which is disclosed as a sliding block lockable into two axial positions or "power settings", a spring-biased, pivoting trigger with a detent extension which engages into a recessed "shoulder" feature of the rod. The disclosure teaches details of why the "cord" is attached to the forward or distal tip of the rod; this arrangement introduces the same accuracy and range problems noted above for Blanchard-091. The patent does not disclose or claim any specific "drag line" or coil-holder, spool or reel or method for holding and/or releasing the "cord".

U.S. Pat. No. 1,598,323, issued Aug. 31, 1926 to Spencer, T R (Spencer-323) discloses a spring-drive, bait-hurling pistol which includes a large sliding cup to contain the bait, hooks and weight. The most notable feature, which is described in detail in the specification, is the bell-crank linkage between the trigger and the release pin which holds the bait-cup in its armed position. No teaching can be found in this specification about user safety, casing accuracy, casting range or bait aerodynamics after launching from the cup. Likewise no mention is made in the specification about the dynamic effects of the line being released to allow movement of the bait/hooks.

U.S. Pat. No. 3,292,295, issued Dec. 20, 1966 to Saltness, N H], Saltness-295. Saltness-295 discloses and claims a "fishing pistol". Claim 1 is a typical Jepson improvement format which reads on the combination of a—fish line/lure/reel, B—a projectile and C—a projector. Claim 2/1 reads on a "stop" attached to the line. Claim 3/1 reads on a projectile with a "concentrated" mass. Claim 4/1 reads on a projectile with a "tubular rear portion and a bulbous forward portion". No teaching can be found in this specification about user safety, casting accuracy, casting range or bait aerodynamics after launching from the cup. Likewise no mention is made in the specification about the dynamic effects of the line being released to allow movement of the bait/hooks.

BRIEF SUMMARY OF THE INVENTION

This invention is a self-contained device which can be held in one human hand, capable of propelling a tethered projectile accurately through a path where space may be limited and/or through a path where obstructions must be worked around; in either or both cases, through an area where it would be considered impossible and/or dangerous for a human to explore.

BRIEF DESCRIPTION OF THE DRAWINGS

FIG. 1b is a sectional view of the distal eye portion of the projectile cut by plane P1 as indicated in FIG. 1a.

FIG. 1c is a sectional view of the intermediate flange of the projectile cut by plane P2 as indicated in FIG. 1a.

FIG. 1d is a sectional view of the proximal flange of the projectile cut by plane P3 as indicated in FIG. 1a.

FIG. 1e is a arc-sectional view of the distal tip loop, which shows the surface texture pattern, cut by curved plane P4 as indicated in FIG. 1a.

FIG. 1f is a close-up perspective-cross-sectional view, which relates to FIG. 1g, of the projectile showing the axial hole and tether extending there through.

FIGS. 2f1 to 2f8 are schematic views of the RE and ESE showing selected coil-spring attachment embodiments.

FIGS. 2f9 to 2f11 are schematic views of the RE and ESE showing two coil-spring attachment embodiments incorporating a fixed or moveable ESE retainer-coupler. FIG. 2f11 is a retainer-coupler sectional detail of the slideable engagement of a notch in the retainer flange with a spring stabilizer rib.

FIGS. 2f12 to 2f14 show RE shape embodiments for increased stiffness and strength of the pivot. FIG. 2f13 shows 5 alternative beam shapes which may be used for the link section or the proximal beam section. FIG. 2f14 shows alternative RE embodiments with a pivot axle or a pivot trunnion.

FIGS. 2f15a to 2f15g show schematic views of alternative placement of the RE pivot axis in zones 1–4.

FIG. 2f16 is a schematic view of the RE showing polar coordinate notation for the pivot axis. P12 denotes the intersection of the projectile guide axis with the proximal face of the RE; P12 is the origin of the polar coordinate system used to define any pivot axis location. The trigonometric relationships between this system and orthogonal coordinates is also included to provide simple conversions between dimensions measured from the x or y value of the pivot axis.

FIG. 2f17 is a schematic view of an embodiment of a coil-spring distal insert; the lower portion shows the relationship of the insert to the distal spring portion and the proximal projectile portion.

FIG. 8 is a sectional view through the targeting ring.

FIGS. 9–9A show additional alternative housing configurations including arm-shoulder stabilized and tripod-, clamp- or table mounts.

FIGS. 11–11A show a schematic view of the release lever and coil-spring showing the release lever, spring, projectile and related linking/coupling/engagement elements and how they define L13.2, the distance between the contact faces of the RE.

FIGS. 12–12A show a schematic view of the release lever and coil-spring showing the release lever, spring, projectile, including related linking/coupling/engagement elements and the barrel to illustrate how these factors define L78, the distance from the RE main arm contact face to the end of the barrel or the projectile guide flanges.

DESCRIPTION OF THE INVENTION

Figure 1A:
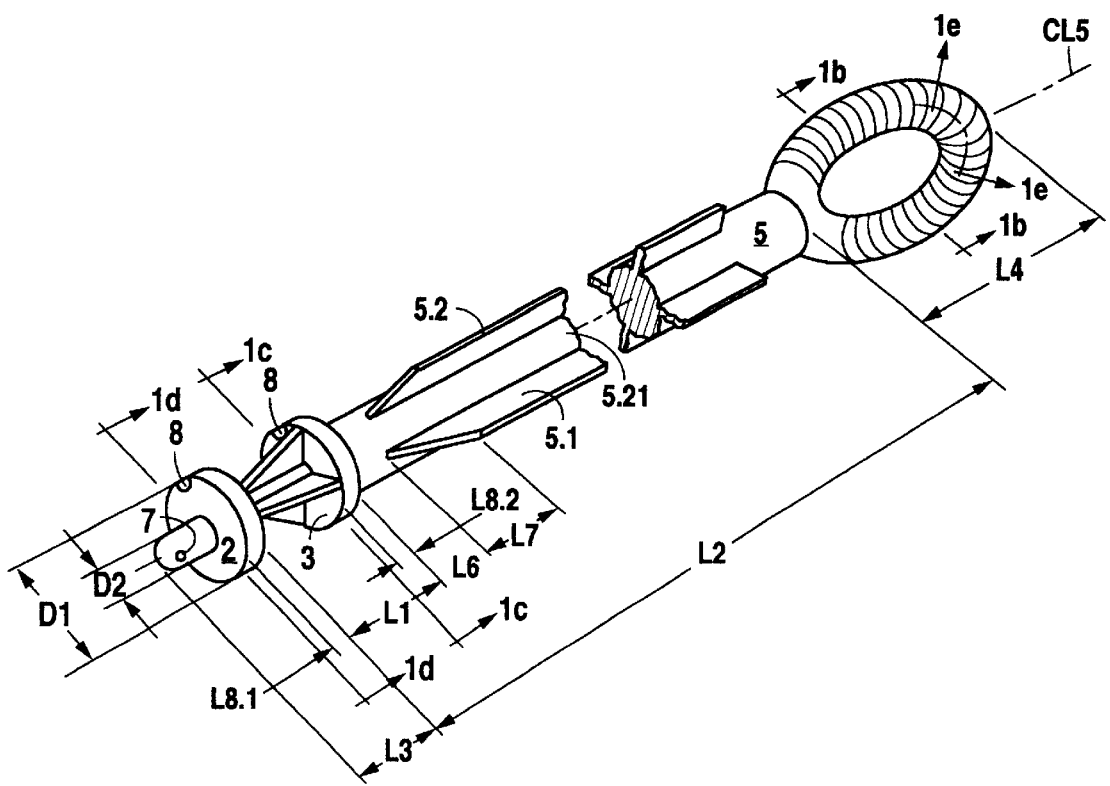
FIG. 1a is an isometric view of the projectile with 4 related sectional details identified below as P1 to P4.

Table 1 gives a complete listing of the indicia and definitions of special nomenclature used herein. For many parameters, the typical value and the usual range, in the units indicated, is given. For the present invention, the optimal dimensions and radial clearances can be conveniently scaled by the free OD of the ESE (energy storage element) or compression spring. The length scaling factors shown in the right column therefore indicate the ratio of the specific length or distance value to the value of D30.3, i.e., the scaled value of D30.3 is exactly 1.00. This sizing approach makes it possible to prepare alternative mechanically-related smaller or larger designs with different power and range without departing from the basic-concept parameters of the present invention. Alternative specific pivot axis positions are designated by specific polar coordinates measured from the a reference point defined by the intersection of (a) the axis of the contact circle defined by the projectile guides with (b) the contact face of the proximal or main arm of the RE (release element) when said contact face lies perpendicular to said axis of guide contact circle. Certain specific length measurements for RE features from a specific pivot axis position, relate of course only to that specific axis position. Such specific measurements can easily be generalized by using known relations of trigonometry and the polar coordinates for the pivot axis.

1,0 Tethered projectile. The projectile is an elongated, rod-like component prepared with two transverse apertures, one at each end. At the distal end is a first aperture large enough to allow passage and attachment of a wire, fiberoptic/copper-wire cable or tube 3–15 mm in diameter. At its proximal end is a transverse aperture large enough to allow passage of mono- or multi-filament tether 0.1–1.5 mm in diameter. The projectile body includes a rib-stiffened elongated portion between the two ends; the length of this portion is approximately 5–50 times its transverse dimension, i.e., as a cylindrical cross-section, it is approximately 5–50 diameters long overall. The projectile body must be straight, constant diameter or transverse dimension and free of general/localized warping; it should be a cross-section which withstands column flexure/crippling due to the axial force

TABLE 4

Mech. Properties of Selected Spring Alloys, SI-Units

| Name | SPEC | SI-TS1* | SI-TS2* | SI-Emod* | SI-Gmod* | TS-fact** |
|---|---|---|---|---|---|---|
| music wire | A228 | 1584.7 | 2749.11 | 207 | 82.68 | 0.45 |
| hard drawn-CLI | A227 | 1012.83 | 1949.87 | 207 | 82.68 | 0.45 |
| hard drawn-CLII | A227 | 1178.19 | 2232.36 | 207 | 82.68 | 0.40 |
| hard drawn-HT | A679 | 1639.82 | 2411.5 | 207 | 82.68 | 0.45 |
| oil temp-CLI | A229 | 1136.85 | 2018.77 | 207 | 82.68 | 0.45 |
| oil temp-CLII | A229 | 1315.99 | 2232.36 | 207 | 82.68 | 0.45 |

TABLE 4-continued

Mech. Properties of Selected Spring Alloys, SI-Units

| Name | SPEC | SI-TS1* | SI-TS2* | SI-Emod* | SI-Gmod* | TS-fact** |
|---|---|---|---|---|---|---|
| carbon, valve | A230 | 1481.35 | 1653.6 | 207 | 82.68 | 0.45 |
| Cr-V | A231 | 1309.1 | 2067 | 207 | 82.68 | 0.45 |
| Cr-Si | A401 | 1619.15 | 2067 | 207 | 82.68 | 0.45 |
| SS 304/302 | A313 | 861.25 | 2239.25 | 193 | 68.9 | 0.35 |
| SS 316 | A313 | 757.9 | 1688.05 | 193 | 68.9 | 0.40 |
| SS 17-7 PH, CH | A313 | 1619.15 | 2308.15 | 207 | 75.79 | 0.45 |
| phos. bronze-A | B159 | 723.45 | 999.05 | 103 | 41.34 | 0.40 |
| beryl. cooper | B197 | 1033.5 | 1584.7 | 131 | 48.23 | 0.45 |
| monel-40 | AMS7233 | 999.05 | 1240.2 | 179 | 68.9 | 0.40 |
| monel-K500 | QQN286 | 1102.4 | 1378 | 179 | 68.9 | 0.40 |

Notes: *—Tensile strength and modulus values in MPa, typ. commercial wire
TS1 is the lower limit value for std. tensile yield strength
TS2 is the upper limit value for std. tensile yield strength
**—use this fraction of rated strength for conservation design [this correction is conservative for curvature and torsion corrections]

TABLE 1

INDICIA AND DEFINITIONS

| | | | Dimension Value | | | D30.3 Scaled Typical, no dimension |
|---|---|---|---|---|---|---|
| | | | | Range | | |
| Indicia | Definition, units | Typical | min | max | | |
| 1 | projectile, general | | | | | |
| 2 | proximal flange | | | | | |
| 2.1 | notch in flange face, width or depth, mm | 0.3 | 0.2 | 0.4 | | 0.03 |
| 3 | intermediate flange | | | | | |
| 4 | proximal tip | | | | | |
| 4.1 | notch in proximal tip, width or depth, mm | 0.3 | 0.2 | 0.4 | | 0.03 |
| 5 | shank, general | | | | | |
| 5.1 | shank tapered portion | | | | | |
| 5.2 | shank, const. diam. rib portion | | | | | |
| 5.21 | shank, longitudinal rib | | | | | |
| 5.211 | notch in stiffener rib distal of intermed. flange, width, mm | ~0.2 | 0.1 | 0.3 | | 0.02 |
| 5.3 | core zone adj flanges | | | | | |
| 5.4 | core zone lumen, mm | ~0.5 | 0.5 | 1.5 | | 0.08 |
| 5.41 | core zone proximal-portion lumen (connects to 5.5) | | | | | |
| 5.5 | core zone transverse or, half-through hole diam, mm | ~0.4 | 0.3 | 0.5 | | 0.05 |
| 6 | distal tip loop, general | | | | | |
| 6.1 | loop-transverse friction element, diam or width, mm | ~1 | 1 | 5 | | 0.16 |
| 7 | line anchor hole | | | | | |
| 8 | flange line slot | | | | | |
| 9 | tether line, diam, mm | 0.3 | 0.24 | 0.6 | | 0.04 |
| A1 | angle of eye CL-plane, rib CL plane from vert. ref. plane, deg | ~45 | | | | |
| A2 | distal flange line slot angle from vert. ref. plane, deg | ~25 | | | | |
| A3 | intermediate flange line slot angle from vert. ref. plane, deg | ~30 | | | | |
| D1 | shank diameter, general, mm | 8.4 | 6.72 | 16.8 | | ~1.0 |
| D2 | centering-post diam, mm | 4.5 | 3.6 | 9 | | 0.59 |
| D3 | proximal flange OD, mm | 8.13 | 6.504 | 16.26 | | 1.06 |

TABLE 1-continued

INDICIA AND DEFINITIONS

| | | | Dimension Value | | | D30.3 Scaled Typical, no dimension |
|---|---|---|---|---|---|---|
| | | | | Range | | |
| Indicia | Definition, units | Typical | min | max | | |
| D4 | intermediate flange OD, mm | 8.38 | 6.704 | 16.76 | | 1.09 |
| D5 | section diam. of distal eye, mm | 6.5 | 5.2 | 13 | | 0.85 |
| D5.3 | diam of projectile core, mm | 2.4 | 1.92 | 4.8 | | 0.31 |
| D6 | ID of distal eye curve, mm | 9.3 | 7.44 | 18.6 | | 1.21 |
| D7 | diam of line hole, mm | 0.7 | 0.56 | 1.4 | | 0.09 |
| R1 | eye surf. texture arc radius, mm | 0.1 | 0.08 | 0.2 | | 0.01 |
| L1 | length between flange surfaces, mm | 11.3 | 9.04 | 22.6 | | 1.47 |
| L2 | length from proximal flange to distal zone, mm | 108.5 | 86.8 | 217 | | 14.15 |
| L3 | dist. between prox. flange and prox. tip, mm | 6.2 | 4.96 | 12.4 | | 0.81 |
| L4 | length of distal eye, mm | 26 | 20.8 | 52 | | 3.39 |
| L5 | thickness of ribs, mm | 2.3 | 1.84 | 4.6 | | 0.3 |
| L6 | length of cyl. zone, mm | 2.8 | 2.24 | 5.6 | | 0.37 |
| L7 | length of tapered rib zone, mm | 8.7 | 6.96 | 17.4 | | 1.13 |
| L8.1 | flange 2 thickness, mm | 2.5 | 2 | 5 | | 0.33 |
| L8.2 | flange 3 thickness, mm | 3.2 | 2.56 | 6.4 | | 0.42 |
| L9 | eye surf. texture, chord length, mm | 0.08 | 0.064 | 0.16 | | 0.01 |
| 10 | release element (RE) | | | | | |
| 11 | RE pivot axis (or diam, mm) | 3 | 2.4 | 6 | | 0.39 |
| L11 | offset of pivot axis from centerline of guide rib contact circle, mm | 12.3 | 9.84 | 24.6 | | 1.6 |
| L11.1 | length of main arm re CL10, mm | 18.5 | 14.8 | 37 | | 2.41 |
| L11.2 | offset of main-arm face re pivot axis, mm | 7.4 | 5.92 | 14.8 | | 0.96 |
| L11.3 | offset of engagement face from pivot axis, mm | 57.3 | 45.84 | 114.6 | | 7.47 |
| CL10 | centerline of RE pivot | | | | | |
| A11 | RE angle range, deg | 0 to 10 | | | | |
| 12 | RE main arm | | | | | |
| 12.1 | ESE anchor feature | | | | | |
| L12.1 | offset of anchor feature from CL10, mm | ~12.3 | 9.84 | 24.6 | | 1.6 |

TABLE 1-continued

INDICIA AND DEFINITIONS

| Indicia | Definition, units | Typical | Dimension Value Range min | max | D30.3 Scaled Typical, no dimension |
|---|---|---|---|---|---|
| A12 | main arm angle, ref axis, deg (approx.) | 85 to 90 | | | |
| L12 | distance from pivot to spring CL, mm | | | | |
| 13 | RE engagement arm (REA) | | | | |
| A13 | REA face angle, ref axis, deg (approx.) | 90 to 105 | | | |
| L13.2 | sepn. dist., main, engagement faces, mm | ~50 | 40 | 100 | 6.52 |
| L13.3 | length of engagement arm re CL10, mm | ~8 | 6.4 | 16 | 1.04 |
| 13.5 | REA tip land | | | | |
| L13.5 | length of REA tip land, mm | 3.6 | 2.88 | 7.2 | 0.47 |
| 14 | actuator arm | | | | |
| 15 | RE flange-engagement mode | | | | |
| 16 | pivoting bar, cyl. curved face | | | | |
| 17 | notched roller | | | | |
| 18 | sliding yoke | | | | |
| 19 | other | | | | |
| 20 | energy storage element (ESE), general | | | | |
| CL20 | ESE centerline | | | | |
| L20 | free length, mm | 25 to 200 | | | (scalable) |
| D20 | compressed OD, mm | 5 to 10 | | | (scalable) |
| E20 | max energy stored, Nm | 50 to 100 | | | (scalable) |
| L20.1 | solid, compressed length, mm | 20 to 70 | | | (scalable) |
| K20 | typ. rate, N/mm | 0.2 to 2 | | | (scalable) |
| 30 | compression spring energy store | | | | |
| CL30 | centerline of spring | | | | |
| L30 | free length, mm | 112 | 89.6 | 224 | 10 to 20 |
| L30.1 | nom. coil pitch, free, mm | 3 | 2.4 | 6 | 0.3 to 0.5 |
| L30.2 | length, intermediate compression, mm | 47 | 37.6 | 94 | 4 to 8 |
| L30.3 | length, max. compression, mm | 36.2 | 28.96 | 72.4 | 3 to 6 |
| L30.4 | mm. radial offset of RE engagement edge with projectile or guide axis, mm | 10.5 | 8.4 | 21 | 1.37 |
| D30 | wire diam, mm | 0.94 | 0.752 | 1.88 | 0.1 to 0.3 |
| D30.1 | active-coil ID-free, mm | 6 | 4.8 | 12 | 0.78 |
| D30.2 | active-coil OD-max. compression, mm | 7.8 | 6.24 | 15.6 | 1.02 |
| D30.3 | active coil free OD, mm | 7.67 | 6.136 | 15.34 | 1. |
| N30 | active coil count | 30 | 24 | 60 | (NA) |
| K30 | rate, N/mm (*parameter scaling by %) | 0.85 | 0.68 | 1.7 | 50 to 200%* |
| 31 | coil spring distal insert | | | | |
| A31 | insert distal centering recess cone angle, deg | 120–170 | | | |
| A31.1 | insert proximal chamfer angle, deg | 0–45 | | | |
| D31 | insert distal end flange OD, mm | ~7 | | | |
| D31.1 | insert proximal end surface diam., mm | 4–6 | | | |
| D31.2 | insert thread-crest diam., mm | 6.5–7.5 | | | |
| L31 | insert thread pitch, mm | 3–4 | | | |
| L31.1 | insert distal end flange thickness, mm | 1–2 | | | |
| L31.2 | insert overall length, mm | 6–10 | | | |
| 40 | release element safety latch | | | | |
| 50 | guide ribs | | | | |
| CL50 | ID centerline (center of rib-contact circle) | | | | |
| TC50 | tolerance circle for ID center (CL50), diam, mm | 0.1 to 0.2 | (scalable) | (scalable) | ~0.01 |
| 51 | longitudinal projectile guide ribs (PGR) | | | | |
| L51 | typ. radial gap, projectile flange to PGR, mm | 0.1 | 0.08 | 0.2 | ~0.01 |
| 52 | stabilizer ribs for spring (SR) | | | | |
| L52 | typ. radial gap, compressed-spring to SR | 0.1 | 0.08 | 0.2 | ~0.01 |
| 60 | targeting device, general | | | | |
| 61 | support | | | | |
| 61.1 | housing socket for engaging support tabs | | | | |
| 62 | radiation-beam generator, general | | | | |
| 63 | incandescent bulb, lenses | | | | |
| 64 | laser beam source | | | | |
| 65 | pointing device, open sights | | | | |
| 66 | telescopic lens | | | | |
| 70 | line holder | | | | |
| 71 | support with end tabs | | | | |
| 77 | muzzle ring | | | | |
| 77.1 | spare projectile clip | | | | |
| L78 | stack-up distance for barrel length, mm | 80–200 | 105 | 200 | 10 to 25 |
| 80 | reserve projectile holder | | | | |
| 90 | housing | | | | |
| 100 | release lever (trigger) | | | | |
| 110 | guard for release lever | | | | |
| 120 | safety latch | | | | |
| 120.1 | wedge leading edge | | | | |
| 120.2 | wedge section | | | | |

TABLE 2

ALTERNATIVE MATERIALS

| Polymer Class | Specific Gravity | Tensile, kPa | Modulus, MPa | Elongation, % | Heat Dist. Temp, C. |
|---|---|---|---|---|---|
| acetal | 1.42 | 65 | 2.79 | 44 | 117 |
| ABS | 1.04 | 45 | 2.24 | 100 | 101 |
| acrylic | 1.18 | 68 | 2.76 | 5 | 82 |
| PTFE | 2.16 | 28 | 0.52 | 240 | 56 |
| polyamide, 6/6 | 1.14 | 83 | 3.07 | 180 | 93 |
| polycarbonate | 1.20 | 62 | 2.38 | 85 | 137 |
| polyimide | 1.43 | 69 | 2.07 | 7 | 360 |
| polypropylene | 1.10 | 30 | 2.76 | 350 | 78 |
| polystyrene | 1.06 | 48 | 3.10 | 2 | 87 |
| polyurethane | 1.20 | 43 | 0.02 | 550 | 93 |
| PVC | 1.50 | 18 | 0.34 | 270 | 79 |
| polyphenylene oxide | 1.06 | 76 | 2.62 | 70 | 191 |
| polysulfone | 1.25 | 69 | 2.48 | 80 | 174 |

TABLE 3

ALTERNATIVE ENERGY-STORE COMPONENTS, MATLS.

| Type | Length range, mm | Diameter range, mm |
|---|---|---|
| elastomer (1) | 20–200 | 4–12 |
| coil spring (2) | 20–224 | 4–12 |
| pneu. bladder (3) | 20–150 | 4–15 |

Notes:
1. As used here, elastomer means any natural or synthetic compressibly-compliant material with any known surface texture or coating. The term elastomer also includes composites and foams.
2. As used here, coil spring means any helix-coil spring made of any material including pure metals, alloys, polymers, ceramics, cermets. Springs may have elastomer surface coating for corrosion resistance.
3. As used here, pneumatic bladder means one or more series-connected elastomer chambers filled with one or more compressible fluids.

which must be applied to compress the propulsion, power source or Energy Storage Element, ESE, as it is inserted into the guide tube. The proximal portion is prepared with one or more transverse flange features for engagement with the pivoting release element described below. These spaced-apart flanges provide for selected levels of energy for driving the projectile, i.e., to achieve predetermined combinations of velocity, range and accuracy. The selected flange interacts with the distal portion of the release element to store energy. Upon actuation, i.e., rotation, of the pivoting release element, which disconnects the interaction, the projectile is launched. The projectile may also include stiffening ribs to prevent column buckling under the compressive force needed to store energy into the ESE. The rib count, angular displacement, form, shape, radial extension, moment of inertia and radius of gyration may be further optimized for one or more specific applications.

As the projectile travels toward the target, it pulls a growing length of tether line behind it The tether line may originally be in the form of: (a) a loose helix coil, (b) a serpentine array, (c) a target-aligned or random aligned straight length ahead of the launch point, (d) a straight length behind the launch point (e) rolled/wound onto a rotatable spool whose axis is transverse to the projectile axis for rotary unwinding by rotation of the spool or (f) coiled on a rotatable spool for off-the-end delivery from the launch point. Physical characteristics of the tether play an important role in trajectory of the projectile. A trailing length of heavy or stiff tether line can produce an increasing restraining force between the projectile and the played-out length of tether. A trailing length of straight line may under certain conditions exert a useful stabilizing effect upon the flight of the projectile, i.e., if the initial momentum does not act along its axis, the projectile may be subject to tumbling due to unbalanced forces.

"Curly" line, e.g., due to spool set of a monofilament, may cause significant torsional force in addition to restraining forces related to its mass and its random oscillations due to air friction effects. Each of these factors offers a different combination of dynamic forces which operate upon the traveling projectile and can significantly influence its trajectory, range and accuracy.

Figure 1B:
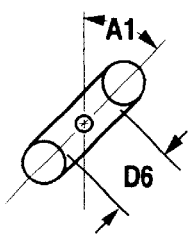
Figure 1C:
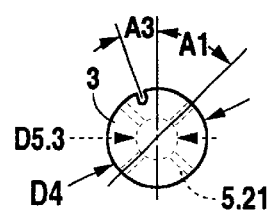
Figure 1D:
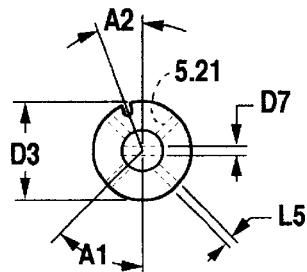
Figure 1E:
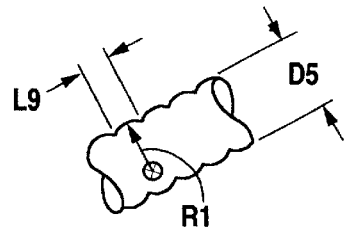

FIG. 1a shows the general external appearance of the projectile in an isometric view with section planes indicated. The projectile 1 includes a distal eye loop 6, a shank zone 5, which includes a zone of tapered longitudinal ribs 5.1, a zone constant-diameter longitudinal ribs 5.2 and a central core zone 5.3. The projectile is shown with four identical, symmetrically-placed longitudinal ribs indicated separately as 5.21; each rib is basically a flat element aligned radially about the projectile axis, CL5, prepared with a rounded tip. The projectile is shown with two transverse flanges: 2 the proximal flange and 3 the intermediate flange. The tips of the ribs are tangent to a circle approximately the same diameter as the shank 5 and the flanges 2 and 3. In the sectional views of FIGS. 1b, 1c and 1d, a vertical reference plane is indicated by centerline symbols. The angular relationships of the fine slots in the flanges to that reference plane are shown as A2 and A3. Similarly, the angle between the vertical ref. plane and the planes of the opposite ribs is indicated by A1. The plane of the distal eye loop relative to the vertical ref. plane is indicated as A1. The axis of the line anchor hole 7, which extends through the round-tipped proximal centering post, is shown as generally to the vertical ref. plane.

One or more flange slots, 8, are sized in width and depth to allow easy insertion and removal of the line; the purpose of the slots is to provide a secure recess through which the line can be passed distally during insertion of the projectile. In this figure the proximal and intermediate flange are both shown with a single slot; other alternative embodiments may be prepared with more than 2 flanges and all flanges may have more than one slot. Still further alternative embodiments may be prepared such that each of the flanges may have different numbers of slots and slightly different angular alignments (A2 and A3); for such embodiments the slots should be aligned to allow the tether to lie between the same two adjacent ribs. In the full-power state, the a major portion of the line passes from the proximal tip to the distal tip within the cavity provided by two adjacent ribs. The flange slots further protect the line, which is laid between the ribs during acceleration of the projectile and prevent it from becoming wedged in the gaps between the flange and the guide ribs or causing frictional drag by sliding contact as it slides along the guide ribs. The proximal centering post extends into the distal-end turns of a coil-spring ESE; the radial clearance between its OD, D2, and the ID of the ESE must be sufficient to accommodate the one or two line thicknesses and a portion of the bulk of the attachment knot. For maximum shielding of the length of line which lies between the ribs, the projectile should be inserted with approximately the orientation shown in FIGS. 1a–1c. Careful attention to this optimal alignment of the projectile and shielded line portion re the release element arm avoids the undesirable condition of the line blocking full engagement or, upon release, becoming tangled with the release element at the end of insertion. D1 is indicated as the general diameter of the shank, meaning the circle which encompasses the tips of the ribs and the diameter of the portion just proximal to the distal loop. The intermediate flange diameter is shown as D4; the proximal flange diameter is shown as D3. To anticipate the possibility that long/large line knots and untrimmed, long line ends may be left by some users, it may be desirable to make the proximal flange a somewhat smaller diameter, i.e., D3 is less than D4. However, if the line is attached by adhesive or fusion bonding inside the anchor hole 7, to avoid bulky knots/ends, the two diameter values may be the same. The spacing between the transverse flanges is shown as L1; this value is selected by consideration of the difference in available power to be provided by two different stages of compression of the ESE. If the projectile is inserted against the ESE to a distance sufficient to allow engagement of the intermediate flange, i.e., to the full power status, the proximal-end column portion must support the force between the engagement arm and the ESE. Since this force is not applied along its axis, CL5, but rather along the line or surface of contact between the tip 13 and the distal flange surface, the column-like end portion is subject to bending. The distal loop portion may be in the general form of a circle, a modified teardrop shape or an intermediate form such as blunt-oval. To anticipate the possibility that the projectile may strike a person's skin or a fragile/delicate surface at high velocity, the distal eye loop portion, 6, may be prepared with an optional textured surface which allows the momentum to be dissipated with minimal damage, pain or injury by sliding friction. Details of one surface texture embodiment are shown in the sectional view of FIG. 1*e*; this illustrative texture is indicated using the usual conventions for surface roughness. The protuberances are indicated as arc-like segments with a radius R1; the chord distance across such a surface protuberance is indicated as L9. The inner diameter of the distal tip loop portion is shown as D6; the external length of an oblong distal tip loop is shown as L4. The overall length of the projectile is the sum of L3, L2 and L4. The length of the proximal centering post measured from the proximal face of the proximal flange is in the range 0.5(D2) to 5(D2),i.e., the post extends 0.5–5 diameters past the proximal flange. FIGS. 1*a* to 1*e* do not show other features which are depicted in detail elsewhere.

Figure 1F:
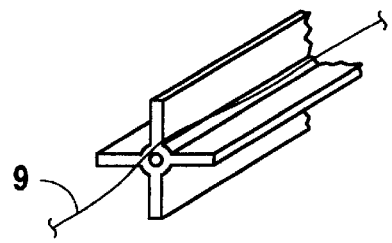
Figure 1G:
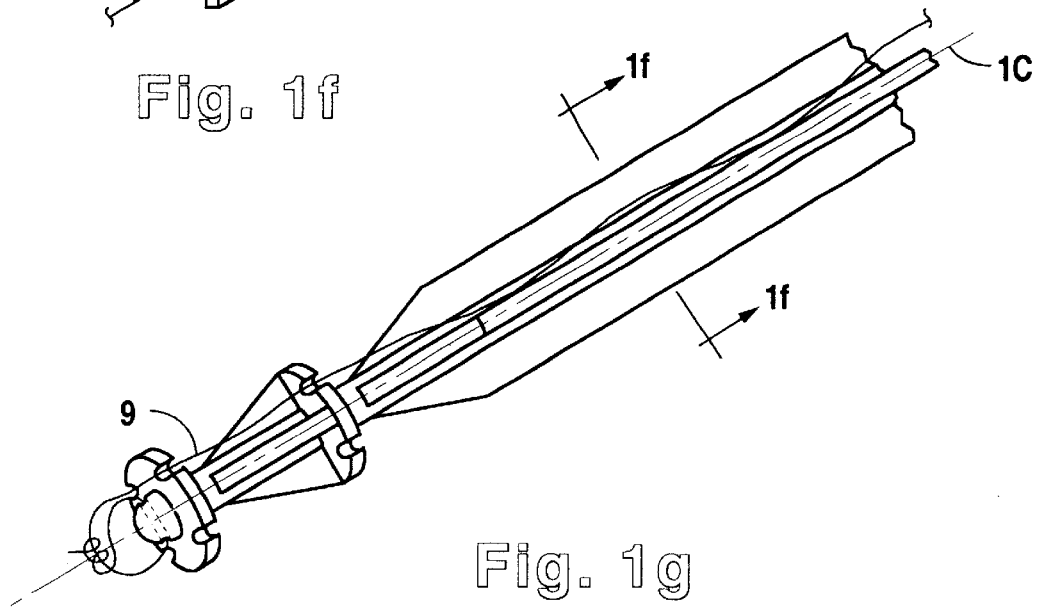
FIG. 1g is a perspective view of the proximal portion of the projectile.
Figure 1H:
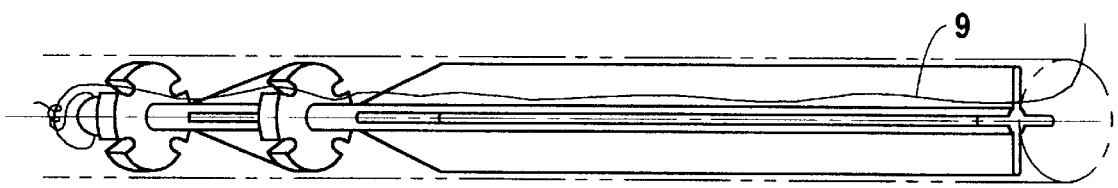
FIG. 1h is a side view of the projectile showing placement of the tether through flange notches and along the space between adjacent projectile ribs.
Figure 1J:
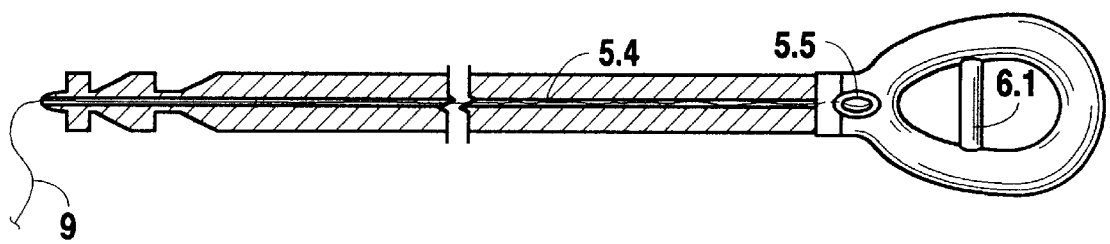
FIG. 1j is a partial cut-away view showing attachment of the tether adjacent the distal eye and threaded through an axial hole; this view also shows the transverse friction element across the eye loop.

FIGS. 1*f* to 1*h* show more details of an alternative method for attaching the tether through the transverse hole and placing it through selected flange notches so that it lies between two adjacent ribs the entire length of the shank. FIG. 1*f*, which is a sectional view of the shank at a point between the distal end and the intermediate flange, illustrates mid-shank tether placement. FIG. 1*g* is an isometric view showing more detail of tether placement just before insertion into the barrel. FIG. 1*h* is a phantom view showing the projectile and placed-tether inside the barrel tube. FIG. 1*j* is a plan view of an alternative projectile with its proximal portion cut away to expose an axial hole, 5.4, extending from the proximal tip to a point near the distal eye zone. This hole intersects a half-through radial hole, 5.5, adjacent the distal loop. The purpose of axial hole is to provide a simple anchor point for attachment of the tether by a knot or other means. Both 5.4 and 5.5 are sized and positioned to allow easy passage of the tether. It is also envisioned that the tether attachment can be: bonded to or knotted around the loop, self-knotted to form a sufficient bulk just outside the radial hole or have a small bead bonded to the tip extending from the hole 5.5. Having the tether inside the projectile makes it possible to separate the attachment position from the proximal tip and thus avoid bulky knots and free ends which might tangle with the ESE contact arrangement.

Figure 1K:
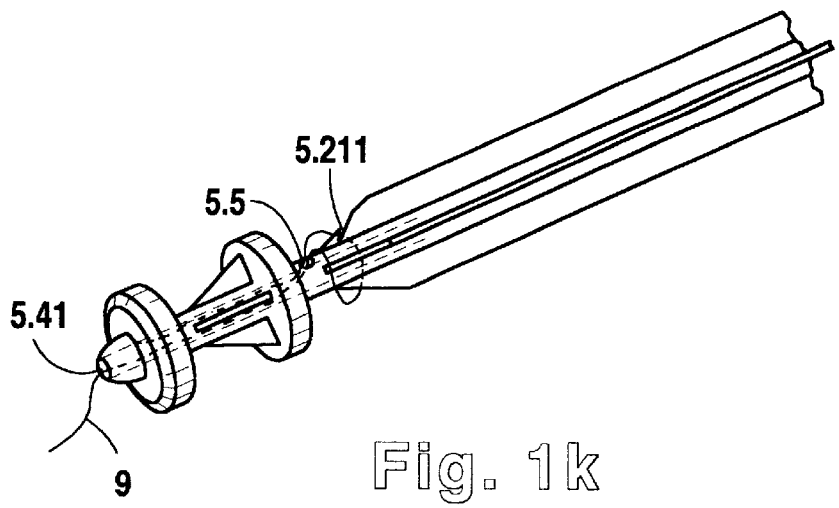
FIG. 1k is a partial cut-away view of the proximal projectile portion showing an embodiment with the tether anchored into a rib notch. In this embodiment the projectile has a partial-length axial hole extending from the proximal tip to the transverse hole.

FIG. 1*k* is an isometric view of the proximal end of another alternative projectile showing a partial length axial hole, 5.41, extending from the proximal tip to a point just proximal of the intermediate flange where it intersects with a half-through radial hole, 5.5. The tether is shown threaded into the hole from the proximal end, emerging through the radial hole, wrapped around the shank and fixed into a rib notch, 5.211; the free end is then re-threaded into the axial hole to avoid possible wedging and entanglements mentioned earlier. This configuration does not avoid having to carefully position the tether between ribs during loading (see FIG. 1*g*), but it does eliminate knots at the extreme proximal tip (see FIG. 1*g*).

1,1 Distal End. The distal projectile end is a loop-like form for attachment of cable or wire to be retrieved.

1,1,1 Frictional Cable Attachment. The distal loop of the projectile of this invention may contain one or more features which facilitate frictional attachment of wire or a small cable without tying a knot. FIG. 1*j* shows a plan view of one such frictional bar, 6.1; it is shown as a transverse bar element which extends across the open loop. For increased friction with the insulation sheath, the bar may: have spline-like surface ridges, be square or triangular or have a knurled-type surface texture. The friction bar may be formed integral with the projectile or attached by a secondary operation such as adhesive bonding, welding or other known technique.

1,1,2 Impact-Absorbing Features. The distal end of the projectile may also be fitted with impact-absorbing coverings, coatings or sheaths which provide protection to delicate equipment adjacent the intended target or to an unintended non-target area such the user or a coworker adjacent the release point. Such optional surface features are prepared with two goals: (a) minimal effect upon range and accuracy of the dart and (b) effective level of impact force/momentum distribution to avoid skin penetration.

1,2 Proximal End Geometry. The proximal tip of the projectile of this invention may be prepared with several different geometric form to achieve desirable benefits, i.e., centering of the proximal tip onto the axis of the ESE element and provision for keeping the tether (which passes along the inserted length and through the muzzle) or ends of the tether attachment knot from tangling with the end coil for a coil-ring energy store.

Figure 1L:
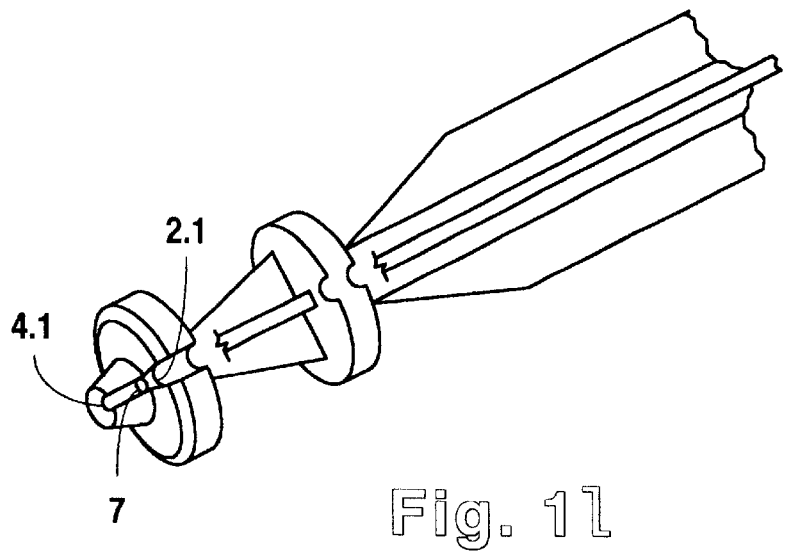
FIG. 1l is a perspective view of the proximal portion of the projectile showing recesses and notches for accommodation of tether.

1,2,1 Tether Notches in Proximal Tip and Proximal Face of Proximal Flange. Alternative embodiments of the projectile of this invention may also include one or more additional tether notches for the purpose of providing safe recesses for passage of the tether and or knot-tails during compression of the ESE. Such safe recesses are useful to avoid localized surface damage to and/or plastic deformation of the tether by hard, sharp edges of the ESE or other intermediate coupler. These embodiments are shown in FIG. 1l, which is an isometric external view of proximal tip showing details of a tether notch, 4.1, cut into the surface of the proximal tip, 4, and a related face notch, 2.1, cut into the flange surface. Both 4.1 and 2.1 are shown as surface features having a width and depth somewhat larger than the tether diameter so that the tether can be "nested" during ESE compression. Ideally, the transverse hole, 7, may also be positioned to align with the notch; in this way the bulk of the attachment or knot and free "tails" can also be "hidden" into the notch during insertion. However, in the case of a projectile with an axial bore, other alternative embodiments may be prepared wherein the notch, 4.1, is formed as a U-, or V-shaped slot in the tip portion, i.e., the notch depth is equal to the local wall thickness over all or part of the distance between the extreme tip and the proximal face of the proximal flange.

1,3 Shank. The shank of the projectile of this invention includes the core portion and an array of longitudinal stiffener ribs which extend radially outward from the core. Because the shank must carry compressive forces during loading, it should be optimized for this purpose; this has been accomplished by choice of mechanical properties of materials and by choice of the cross-section configuration.

1,3,1 Shank Stiffener Ribs. Although the longitudinal ribs, 5.2, are shown as an array of 4 orthogonal, flat, radial elements with a rectangular cross section, they may: (a) have alternative complex-curve forms, e.g., parabola, sine, etc., (b) be in arrays of 3–10, and (c) may be unequally spaced and at other specific non-orthogonal angles. An array of three or more radial stiffener ribs may be molded into the projectile when it is produced as an injection-molded polymer. Similarly, such ribs may be formed by other known polymer-fabrication/shaping processes. The main purpose of the ribs is to: (a) prevent column buckling and fracture of the projectile upon impact and (b) to stiffen and reinforce the core thereby providing a strong, straight link between the tether and the cable being pulled. Alternative embodiments of the projectile of this invention may employ an array of stiffener ribs of one material attached to a solid or tubular core of another material, i.e., aluminum ribs on a polymer core or an array of extruded fluoropolymer ribs fitted to an aluminum core. Other alternative projectile embodiments may include a sub-array of radial ribs shorter than others and in different pre-selected patterns for improved stiffness/strength.

1,3,2 Shank Core. For simplicity, the drawings in this present disclosure show the projectile core as a solid circular cylinder surrounded by an array of radial ribs of identical radial extension. Alternative embodiments may include one or more of the following: an elliptical or n-gon shaped core and the core as a non-polymer mold insert, e.g., metal, alloy, ceramic.

1,3,2,1 Tubular Shank Core. Alternative embodiments of the projectile of this invention may be provided with an axially-centered, rotationally-symmetric lumen over all or a portion of its length. An integral lumen may be provided by many known molding or shaping processes. Stiffness compensation, i.e., adding more/larger stiffener ribs, may be needed if the lumen area removes more than about 20 percent of the core section area in the central zone of the shank.

1,3,3 Shank Inserts. Alternative embodiments may include a full-length or partial-length rod or tube molded into the core region; the insert is centered on the axis of the projectile and may make up a significant fraction of the core area. The insert may be electrically conductive or have selected magnetic properties. The insert may impart significant lateral and/or axial stiffness to the core portion because of: (a) its shape, i.e., splined, (b) cross-section area, i.e., thick walls, (c) its elastic properties or (d) its high yield strength.

1,4 Geometry of Proximal End and Guide Flange Array. The proximal-end geometry of the projectile of this invention includes the following key parameters: (a) spacing between the proximal and intermediate flanges, if there are multiple flanges, (b) the OD value for each flange, (c) the form of the proximal tip, adjacent the proximal flange, which engages the ESE and centers the projectile, (d) the stiffness of the shank core and ribs between the proximal and intermediate flanges, if there are multiple flanges and (e) the angle of the contact faces of the flanges re the axis of the projectile. Ideally, a flange contact face is a cone-surface with an included angle of less than 180 deg to provide a slight positive retention of the distal arm of the release element in the fully-engaged state.

1,5 Projectile Materials. A range of suitable polymer materials for the projectile are listed in Table 2. For special purposes, alternative materials such as metals, alloys, ceramics may be substituted or combined with or added to a basic polymer projectile.

1,5,1 Special Composite Projectiles. Alternative composite projectiles may be prepared of multiple materials, to impart special combinations of properties. Addition/attachment/encapsulation of elements or portions with widely-differing physical or chemical properties may be used to prepare projectiles with unique features, e.g., electrical conductivity (for metal-detector position sensing), wear resistance (scratch- and abrasion-resistant coatings, sheaths, etc., esp. on high-friction flange zones and the flange-mating surface of the distal arm of the spring support), magnetic susceptibility or remanence (magnetic property position sensing), optical response in visible wavelengths (reflectivity, fluorescence, phosphorescence, luminescence, etc.), radioisotope markers (for extended-range projectile position sensing, measurement or detection by emissions such as betas or gammas). To provide various "tracer" characteristics, the projectile may be fitted with: (a) a fugitive trail-forming material in a porous surface coating, (b) one or more material-dispensing orifices or (c) a frangible impact-marking zone or impact-sensitive capsule-orifice plug which begins to release a visible marker material—powder, spray, fog, aerosol, etc.—upon landing (this feature would make it possible to mark both the impact point and the retrieval path).

1,5,1,1 Ballasted Projectiles. To achieve greater range and improved aerodynamics, alternative projectiles may be prepared with additional mass or ballast added to the distal portion A distal ballast mass such as dense metal with specific gravity in the range 2–22 may be attached by means of: (a) friction-fitted, removable inserts into the loop opening, (b) welded/bonded clips which encircle the shaft zone or (c) pin or plug inserts which may be forced into prepared through or blind holes in the shank or loop.

1,6 Critical Geometric Tolerances of Projectile 1,6,1 General Form. The length (L) and diameter (D)) of a rod-like projectile formed of a single uniform-density material determine many static and aerodynamic factors, since its center of mass must be balanced with its centers of drag and lift to assure stable flight along a predictable trajectory. The projectile of this invention can be prepared over a wide range of L/D ratios ranging from about 10 to approximately 50 to achieve special performance related to other factors such as design range, tether pull-back forces/torques and spring power. For embodiments which include a significant risk of "curly tether", e.g., in cold environments the coiled tether may develop a profound, permanent spool set, it may be useful to trade off this problem with a longer projectile and/or adding distal ballast.

1,6,2 Flange and Shank OD. Because projectile flanges are subject to abrasive wear during discharge and distal shank/loop portions are exposed to hazards of impact damage and exposure to solvents which may dissolve, warp or swell these critical areas, they all must be carefully inspected before each use. To maintain accurate, low-friction operation, the acceptable local or general radial surface wear of the flanges should be kept in the range of 0.1 mm; larger tolerances due to excess wear may lead to compromises in range and/or accuracy. A related design problem is the radial tolerance between the flanges and the guide-tube ribs; the effects of this parameter upon repeatable trajectory aiming accuracy are discussed below.

1,7 Tether Attachment. Because the momentum of the projectile during most of its flight remains much larger than either the tether inertia or other pull-back forces/torques related to playing off tether, the tether must be attached to the proximal end, as far as possible aft of its center of mass. All embodiments of the projectile of this invention must include this provision in order to limit major tether-related forces/torque to an axial direction during flight; otherwise, eccentric-force oscillations about its center of mass may be a serious cause of poor accuracy, random range and in the worst case, i.e., if the tether is pulled from the distal tip of the projectile, adverse tether effects may induce end-over-end tumbling.

1,8 Axial Projectile Channel. Alternative embodiments of the projectile of this invention may be provided with a full-length or a part-length axial bore through which the tether is: threaded and attached at a predetermined point along the axis. Such embodiments may facilitate ideal attachment of the tether to direct its flight-resistance effects into a direction substantially along the projectile axis and tangent to the trajectory curve.

2,0 Pivoting Release Element (RE). The release element of this invention is a U-shaped pivoting component which includes several key features: (a) a proximal or main arm which is linked to and supports and centers the proximal end of the ESE, (b) a distal or engagement arm which engages the contact face of either the proximal or intermediate projectile flange, (c) a bar-like connective element between the two arms just mentioned, (d) a trigger-like actuator arm which causes the RE to pivot and is operated by finger force or may be tripped by a mechanical device and (e) a pivot mechanism consisting either of an axle which extends through a hole in the RE or a trunnion which extends outward from the RE and mates into a socket in the supporting housing.

Figure 2A:
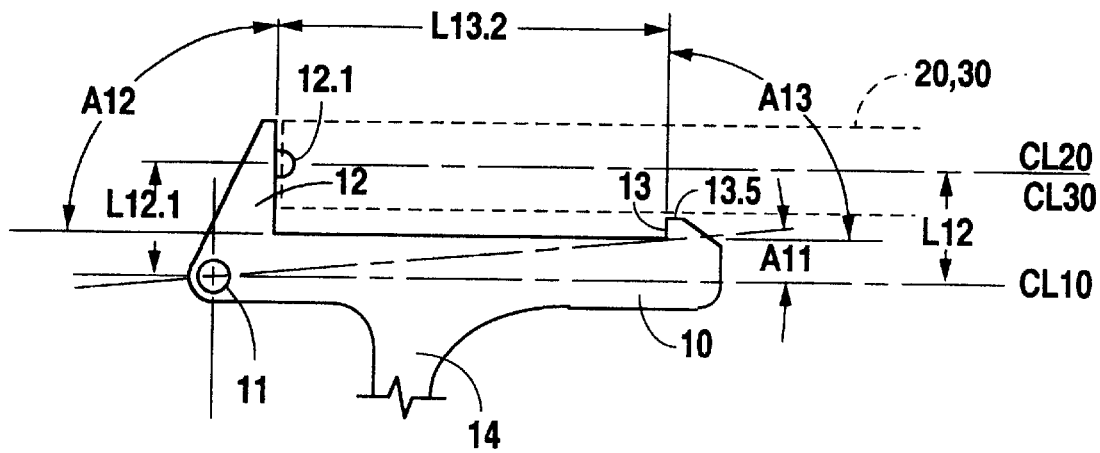
FIG. 2a is a front view of the release element showing its general form and its pivot axis, which is spaced apart from the axis of the projectile guides. This figure also shows the pivot angle of the release element when it is engaged with a selected projectile flange to hold the ESE in a compressed state.

FIG. 2a shows the general form and features of the RE. The RE, 10, is partially shown to prevent confusion with the four arc-like pivot-axis-location zones which are centered about the main arm, 12, particularly the center of its contact area of the ESE. The engagement arm, 13, and the actuator arm, 14, are indicated for general orientation. The exact size and shape of the RE portion behind the arc zones depends, of course, upon the location of the pivot point and the selection of a specific pivot type, i.e., axle or trunnion. The RE can be described as having a "horizontal" position or zero tilt angle when the axis of its connective element lies parallel to the axis of the tube guides and the contact face of the proximal arm is to the centerline of the tube guides, CL50. When the ESE is compressed to a predetermined length against the proximal arm, the RE is pivoted to engage its opposing or distal arm with a transverse flange on the proximal end of the projectile. When engaged to the projectile under the force of a compressed ESE, the RE is subject to bending of its connecting-link zone as well as each of its cantilevered arms due to energy stored in the compressed ESE. For maximum stiffness and strength of the RE, its pivot point and the related transverse axle are located outboard the structural portion. Additional technical factors related to pivot-axis position optimization are disclosed below.

Alternate embodiments of the present invention may include the pivot axis located in any of the four quadrants indicated as zones 1–4 in FIG. 2f16. The center of the circles is defined by the point P12, which represents the intersection of the guide-tube centerline, CL50, on the proximal arm when the RE is in its horizontal or zero position. The outside radius of these zones, which is indicated by long dashes is approximately 3 times the ESE diameter. The inside radius, indicated by short dashes, may be as small as zero; alternatively, for manufacturing reasons it may fall in the range 0.05–0.1 of the ESE diameter. Additional disclosure on properties of pivot axes in each quadrant are provided below. In some alternative embodiments, the pivot axis may be positioned external to the structural elements to avoid complex local states of stress in the boss or trunnion. Such an "outboard" pivot axis may also be desirable for minimum lateral displacement of the proximal end of the compressed ESE during release of the projectile. The distal arm of the RE is prepared with a broad, shaped tip-land portion; this feature reduces surface friction during release of the ESE and prevents actual mechanical interference between the ESE and the RE during compression from the free state.

Figure 12:
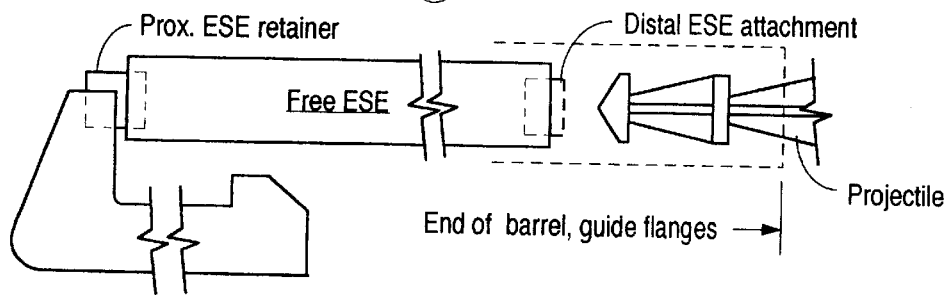
Figure 12A:
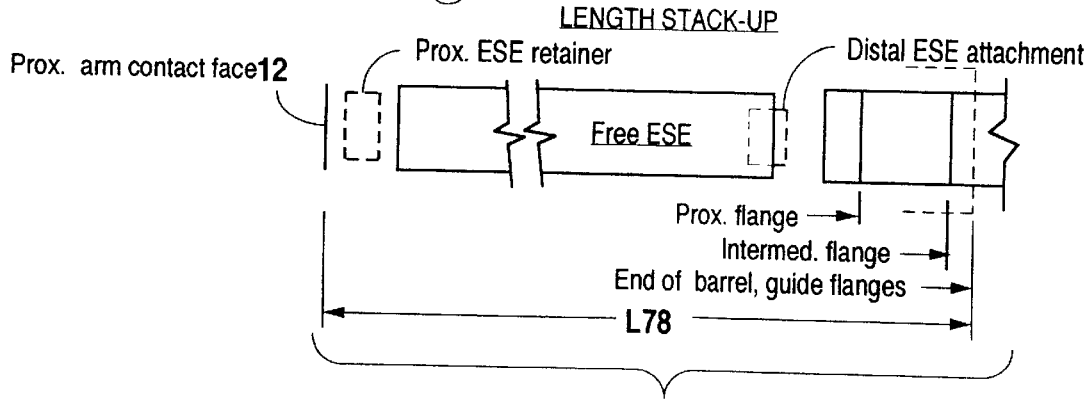

2,1 RE Materials/Insert-Composites/Geometry. Embodiments may be prepared with a variety of cross-section geometry to support minimal bending deflection, e.g., T-, I-, M-, Z-beam profiles, channel, box or other tube-like forms. Embodiments with T-, and I-beam sections may be desirable for molded polymer configurations. Filled and fiber-reinforced, e.g., filaments/particles of hard materials such as glass, carbon or SiC, molded, cast or sprayed polymer RE elements are highly desirable for most embodiments. Foam core, hollow-core and other core-reinforced embodiments may be desirable for applications for which weight is an important factor. Embodiments with mold-inserted stiffeners or wear-resistant components have special value. FIGS. 2f12 and 2f13 illustrate 5 alternative beam-like cross-sections which provide excellent bending stiffness at two representative positions subject to high bending stresses. FIG. 2f14 illustrates a sectional view taken on a cutting plane which crosses the pivot axis; this figure illustrates both pivot-axis trunnion and pivot axle-boss embodiments in 2 alternative sections.

Embodiments with metallic RE elements formed by plastic deformation, i.e., stamping, forging, bending, weldments or extrusion may include many known sections which combine optimal stiffness and other physical/chemical properties. Metallic RE embodiments may also include a variety of known surface treatments to impart selected properties, e.g., corrosion resistance, surface lubrication or surface hardening to improve wear resistance.

2,2 RE Distal and Proximal Arm Elastic Compensation. Injection-molded polymer RE embodiments may be prepared with a free, or "unloaded" shape which precisely anticipates their elastic distortion under the load of the ESE and provides less interference of the compressed ESE with its proximal supports, i.e., due to off-axis movement especially of the proximal arm. Such embodiments are indicated in FIG. 2a by the face-angle values A12 and A13. These two angles are measured with respect to a line drawn along the edge of the "link" portion and parallel to CL20 and CL30. For an infinitely stiff RE structure, these angles may be set at 90 deg; for actual materials and structures however, both values will be somewhat greater than 90 and A12 may be larger than A13.

2,3 RE Pivot Section/Geometry. During compression of the ESE, the axle or trunnion pivots of FIG. 2f14 are loaded in shear. For metal axle-polymer embodiments, such as illustrated in 2f14a, the boss and its supporting webs have to be stiff and strong enough to hold the RE in alignment with the projectile guide centerline without risk of sudden fracture. For polymer trunnion embodiments, such as illustrated in 2f14b, care must be given both to tensile and shear stress zones. Mold-inserted metal or alloy trunnion polymer embodiments may provide significant advantage in safety and cold-temperature fracture resistance.

2,4 RE Pivot Axis Positioning. FIG. 2f15 illustrates schematically several alternative pivot-axis placements and related RE structures for embodiments of the present invention; positions shown in this figure are merely illustrative and not exhaustive. For simplicity, six of the embodiments shown in 2f15 depict a hook-type engagement element to retain a coil-spring ESE attached to the proximal RE arm; FIG. 2f15a however shows a post feature for frictional engagement with the proximal coils.

For simplicity in scaling various embodiments, it is desirable to use polar coordinates to define the position of the pivot axis related to the reference point P12. By convention, the polar angle zero is along the positive x axis i.e., at the "East" compass point, and the distance vector is measured from the origin at P12. Alternate embodiments of the present invention may include the pivot axis located in any of the four quadrants indicated as zones 1–4 in FIG. 2f16. The outside radius of these zones, which is indicated by long dashes is approximately 3 times the ESE diameter. The inside radius, indicated by short dashes, may be as small as zero; alternatively, for manufacturing reasons it may fall in the range 0.05–0.1 of the ESE diameter. Additional disclosure on properties of pivot axes in each quadrant are provided below. The typical angular movement of the RE about its pivot axis may be in the range 0.5–10 degrees. FIG. 2/16 also shows the conventional trigonometric relations necessary to convert between polar and orthogonal coordinates; these are included to simplify interpretation of mixed specifications, i.e., polar for the pivot axis placement and orthogonal for the shape dimensions of the RE and its 2 arm features.

2,4,1 RE Pivot-Axis in Quadrants 1 & 2. A pivot axis located in zone 1 or zone 2 will require the RE to be mounted with a bias element, such a coil or leaf spring, to force its engagement arm into secure contact with a projectile flange. A biasing element may be: (a) integrated into the RE so that it exerts an upward force just below the contact face of the engagement arm or (b) removable but securely attached to produce the same effect as an integrated bias element. A specific bias element and position may be selected to provide a secure offset torque to that due to the ESE and a predetermined additional actuation force or torque.

2,4,2 RE Pivot-Axis in Quadrants 3 & 4. A pivot axis located in zone 3 or zone 4 will force the RE into contact with the ESE during all the compression stages. Such embodiments may require: (a) a mechanical restraint on the RE and/or (b) the land zone of the RE distal engagement arm, must be wider than any surface recess or surface-feature spacing of the ESE. In the case of a coil spring, the length of the land, L13.5, must be greater than the gap between adjacent coils of the free spring in the free state.

2,4,3 RE Proximal-Arm Contact Point Off-Centerline Movement. The quadrants of FIG. 2/16 are centered at the intersection of the tube-guide centerline and the face of the main arm when the RE is "horizontal". The radius of the arc which describes the displacement path for the RE-ESE contact point is defined by the vector from the pivot axis to the ref. point P12. To avoid undesirable static and dynamic effects related to the proximal end of the ESE being off-center re the guide tube axis, CL50, the displacement may be reduced by choosing a longer radius.

2,4,4 Outboard RE Pivot Axis. In some alternative embodiments, the pivot axis may be positioned external to the stress patterns of the structural elements to avoid complex local states of stress in the pivot boss or trunnion. Such an "outboard" pivot axis may also be desirable for minimum displacement of the proximal end of the compressed ESE during release of the projectile. Alternate embodiments of the present invention may include the pivot axis located in any of the four quadrants indicated as zones 1–4 in FIG. 2/16. The typical range of movement of the RE about its pivot axis may be in the range 0.5–10 degrees.

2,5 RE Pivot Boss/Trunnion Section/Geometry. The static and dynamic bending and shear design considerations for these elements is maximum during the compression/release phases and is dictated mainly by ESE power and max. force. These features must be designed to allow repeated heavy load without significant risk of failure during compression or release.

2,6 RE Materials. The RE for selected embodiments may be made of a variety of common metals, alloys, ceramics or polymers. Table 2 lists the design properties of several selected polymers which may be used in alternative embodiments.

2,7 Critical Geometric Tolerances of the RE. The basic function of the RE is to provide instantaneous release of the energy stored in the ESE when its distal arm disengages from a flange contact surface.

2,7,1 RE Distal Contact Face. The contact face angle of the distal-arm should be substantially 90° to the axis CL50 at the moment of projectile disengagement from the ESE for maximum range and accuracy. Embodiments of the RE may be prepared with a compensatory coupling swivel or other angle/lateral-displacement-tolerant retainer fittings. Other RE embodiments may be prepared with selected-angle-value wedges added integral or by attachment of the proximal RE arm to compensate for elastic deflection of the RE structure under max. spring compression.

2,7,2 RE Proximal Arm Spring-Coupler Anomalies During Release. The coupler should neither displace the spring contact center or bend-deflect the end spring coils to any significant degree during release. Alternatives with a post-type coupler-retainer are found to provide cost-effective performance re this factor. The operation of the coupler re mechanical transients during release may also be influenced by the radial tolerance for the ESE guides adjacent their proximal zone.

2,8 RE Proximal Arm-Spring Coupling Details. As pointed out above, angular movement of the proximal contact face may result in sliding-displacement of the ESE in the contact plane and/or bending-displacement of the end portion of the ESE. It is important, therefore, to provide coupling means which accommodate one or both these possibilities.

2,8,1 RE Post Retainer-Coupler Alternatives. Several alternative possibilities for a spring-type ESE are shown schematically in FIGS. 2/1–2/8. FIGS. 2/1–2/2 shows an axial, proximal post extension of the spring which would extend through a prepared hole or slot cut in the main arm of the RE. This approach entails preparation of the main-arm contact face to allow both sliding and rotational contact with the end of the ESE. The post must extend far enough through the main arm to allow placement of a fitting or bend to securely couple the spring to the RE. FIGS. 2/3–4 show other post-coupler variants which may be used for specific applications.

2,8,2 RE Loop/Hook Retainer-Coupler Alternatives. Several alternative possibilities for a spring-type ESE are shown in FIGS. 2/3 to 2/6. FIGS. 2/3–2/4 show a loop lying in the plane which includes the axis of the spring. The loop may encircle a post or snap into groove feature on the main arm prepared with a smaller OD, which would allow both sliding and angular movement in the coupling. Additional alternative forms of this concept are shown in FIGS. 2/5 and 2/6.

Figure 7:
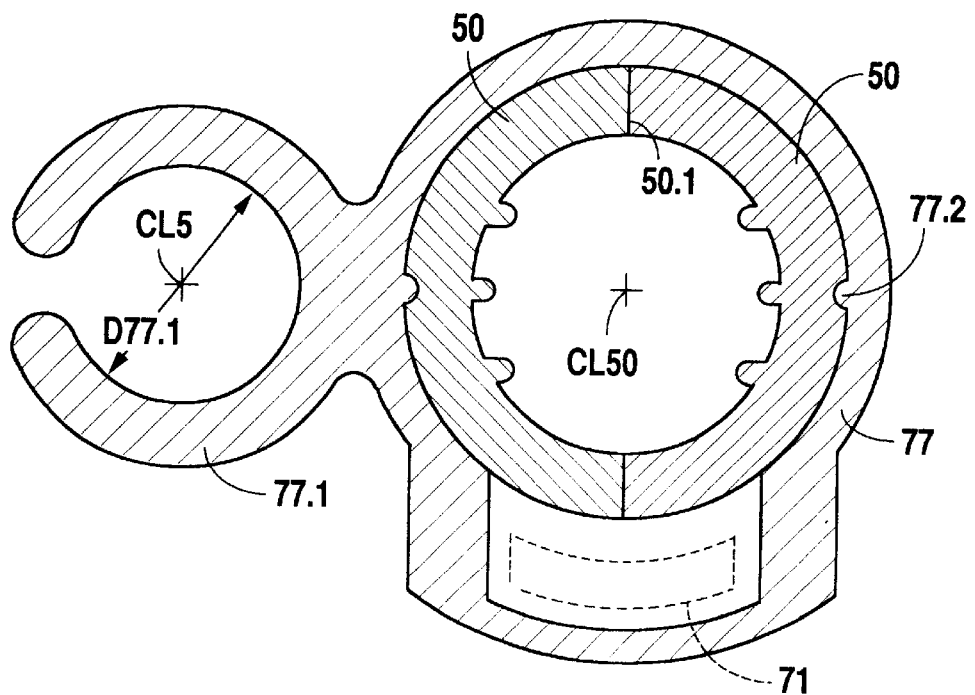
FIG. 7 is a sectional view of the guide tube, muzzle ring and projectile clip.

2,8,3 RE Swiveling Cup-Retainer Alternatives. An alternative retainer cup for a spring-type ESE is shown in FIGS. 2f7–2/8. This alternative is a short cup which encompasses the tip coils and is attached to the "last" or proximal coils by known methods.

2,9 RE Distal Arm-Flange Engagement Details. The distal arm of the RE is prepared with a broad, shaped tip-land portion; this feature reduces surface friction during release of the ESE and prevents actual mechanical interference between the ESE and the RE during compression from the free state.

2,10 Other RE Spring-Support Considerations. ESE may be supported by a wide range of housing/barrel tube designs with respect to ribs and guides. The major factor is the alignment of the ESE with respect to the axis of projection and containment of the buckling forces imposed on the guides during compression of a coil spring or outward expansion of a bladder-type ESE. The following rules generally apply to the three major types of ESE's.

2,10,1 All ESE types. Support ribs should be stiff enough for a max of 0–3% outward deflection during the course of compression or loading and compressed storage of the ESE, returning to less than 0.01–0.5% relaxed deflection/memory after discharge/unloading.

2,10,2 Coil Spring ESE. ESE should be constrained to limit outward eccentric deflection by linear ribs or bars spaced radially at approx. 60 deg.

2,10,3 Bladder-type ESE. Bladder-type ESE should be contained depending on the resiliency, modulus, and thickness of bladder material with expansion tolerance of approx. 2×thickness of the bladder. Radial support must be adapted to the wall characteristics of the bladder.

2,11 RE Features/Parameters for a Zone-3 Pivot Axis. Certain location-dimensional values for this embodiment reflect merely a typical location of the pivot axis re the reference point, P12; for another location vector from P12, the values would be different but related by known trigonometric formulas and the specific coordinates of the specific pivot-axis.

Figure 2B:
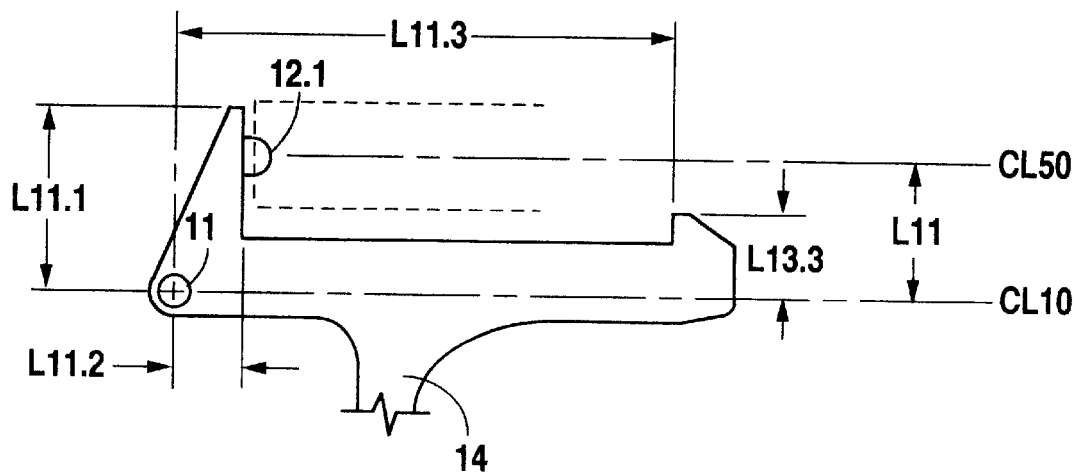
FIG. 2b is a front view of the release element showing the positioning and relative sizes of the main and engagement arms to the pivot axis and other features.

FIG. 2b shows the features of one embodiment of the RE or release element 10. The RE element includes; a pivot boss 11, a main arm 12 and an engagement arm 13. The function of the main arm is to support and maintain centering of the proximal end of the ESE or compression spring; it also includes an anchor feature, which is in the general shape of a protuberance 12.1. In this figure the outline of the free ESE or compression spring is indicated by dashed lines. The engagement arm 13 is spaced apart from the main arm a distance L13.2. The length of the main arm measured to CL10, is adjusted to provide for support of the proximal end of the ESE or compression spring. In the released state the centerline trace drawn through the center point of the pivot boss, CL10, is parallel to and spaced apart from the centerline trace of the guide rib contact circle, CL50; this spacing difference is given by L11. To allow for elastic deflection due to the force exerted by the partially-compressed ESE, the angle between the main arm contact face and CL10 is given by A12. The purpose of this design is to maintain the ESE proximal center aligned with the center of the guide ID contact circle during the release phase. The centerline of the anchoring-centering protuberance 12.1 is spaced apart a distance of L12.1 from CL10. Other factors which should also be adjusted to maintain the proximal end of the ESE or compression spring centered as close as possible to the guide centerline are: (a) the radial tolerance between the OD of the protuberance 12.1 and the ID of the compressed ESE, (b) the offset distance, L12.1, and (c) the face angle, A12. The face angle of the engagement arm is given by A13. This angle is adjusted to compensate for two effects: (a) for elastic deflection of this arm due to supporting the compressed ESE and (b) to provide smooth release when its contact zone slides across the flange surface in the release process. At full engagement, the RE is pivoted toward the projectile axis by an angle given by A13 relative to its released state. The tip of the engagement arm is prepared with a land zone, 13.5 shaped and oriented to prevent mechanical interference with the coils of a compression-spring ESE as they are compressed from the free state. This land width is adjusted to be greater than the free spacing of the coils of a compression spring ESE to prevent accidental wedging between adjacent coils in the free state. The length of the engagement arm, measured to CL10, is adjusted according to two factors: (a) to allow a gap between it and the ESE in the released state and (b) to provide a secure engagement at angle A11 with the surface of a selected flange. In this figure, the actuator arm 14 is shown with a portion cut away. The actuator arm 14 transfers force applied by the operator directly or indirectly to release element. During the release process, the engaged release element 10 is rotated toward the released position, which is shown in FIG. 2b, i.e., in a clockwise direction over an angle approximately equal to A11 due to the application of torque by the operator. This actuation torque must overcome the sliding friction, under the force needed to hold the ESE in a compressed state, in the plane- or line-contact between the release arm and the contact face of the projectile flange. For a variety of contact-surface smoothness and contact-shape profiles of the engagement arm 13 with the flange, the required release-process torque typically falls in the range $1 \times 10^{-4}$ to 0.1 N–m.

Figure 2C:
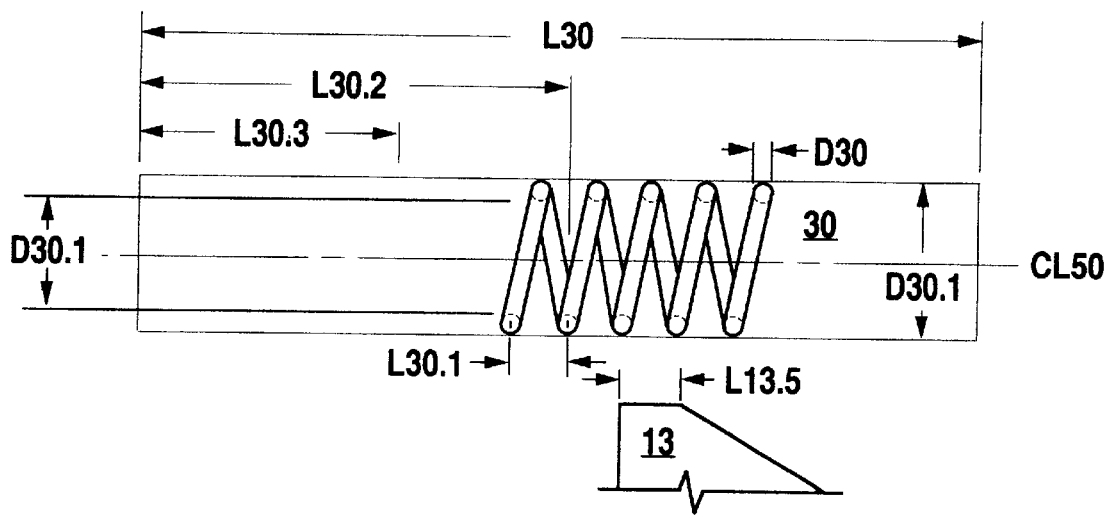
FIG. 2c is a sectional view showing a compression spring ESE in its "free" state and the release element engagement arm in its "released" state.

FIG. 2c provides additional parametric detail on the release element when it is viewed as a pivoting lever. As in FIG. 2b, the free state of the ESE is shown by a dashed outline. The lengths of the main and engagement arms re CL10 are shown by L11.1 and L13.3 respectively. The face offsets of the main and engagement arms re the RE pivot axis are indicated by L11.2 and L11.3 respectively. Since the required release or actuation torque may be applied to the RE by a number of known elements and links and mechanisms, no specific forces or moment arms are indicated to the point of application of the release force. The centering protuberance 12.1 should have at least one point of light frictional fit with the ID of the ESE or compression spring or a loose mechanical coupling with its mating end or end coil. Provision for such fit or coupling prevents axial displacement of the ESE or compression spring in the direction of motion of the projectile during the release process.

Figure 2D:
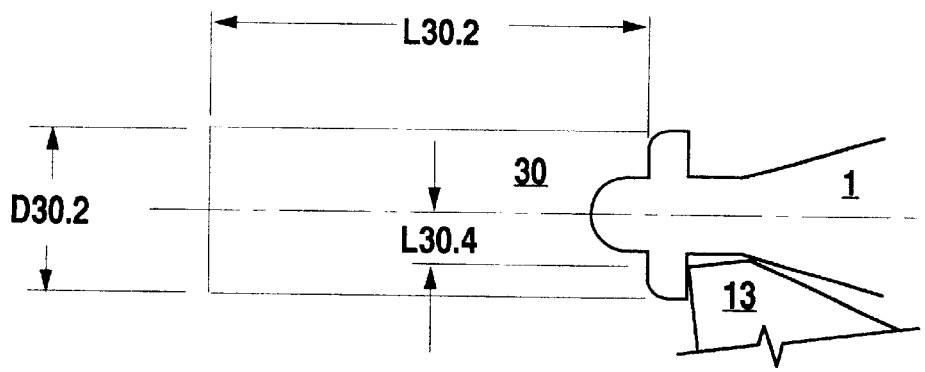
FIG. 2d is a sectional view showing the proximal end of the projectile fully engaged with the engagement arm and the ESE in its first stage of compression.
Figure 2E:
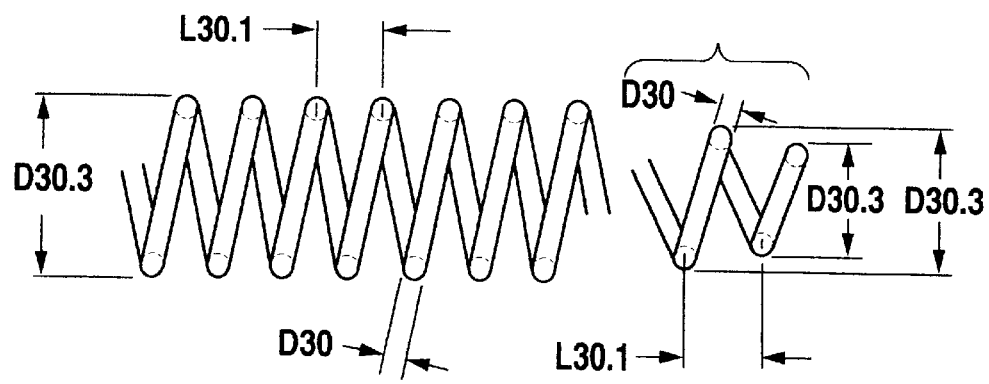
FIG. 2e is a schematic view of a coil-spring ESE showing some selected configuration embodiments.

FIG. 2d provides additional parametric detail on the relationships between a compression spring power store, 30, and the engagement arm 13. The compression spring is defined by its free length, L30, the length in an intermediate compressed state, L30.2, and its length under maximum compression, L30.3. If the coil is formed from ordinary cylindrical wire, its OD given by D30; other known sections such as triangle, oval, square or rectangle may be used and in such cases D30 would represent one of its characteristic dimensions. The free pitch of the active coils is indicated as L30.1 One of the important novel aspects of the present invention is the choice of the size and shape of the RE engagement arm tip land. The length of the land is indicated by L13.5. In this figure the RE is shown in its released position; this makes it clear that there is no actual or possible mechanical interaction between the RE engagement arm tip land 13.5 and the compression spring 30, i.e., the land face lies approximately parallel to CL50 and properly spaced apart from the OD of the compression spring. The sloping distal flank of the RE engagement arm would allow it to be deflected if the release element were accidentally held into contact with the compression spring OD during the process of compressing it with the projectile. Similarly, since L13.5 is greater than the free pitch, L30.1, it is impossible to wedge the RE engagement arm tip land between active coils in their free state.

FIG. 2d shows the RE distal arm 13 engaged with the proximal projectile flange and the compression spring compressed to an intermediate state indicated by L30.2. This figure indicates the RE pivoted into its maximum engagement with the flange. The RE engagement arm contact edge is shown making a line contact with the flange surface which is generally planar and to CL50. Depending upon the specific shape of the RE engagement arm face or edge and the mating surface of the flange, alternative line and/or area contacts can be provided. The OD of the compressed coil spring is shown here as D30.2; measured values of the spring OD change due to compression show a slight increase in the range of 0 to 1%. For this configuration the RE engagement arm contact edge with the flange surface is displaced an amount L30.4 from CL50, the centerline of the projectile in the guide ribs. Although this compressive force acts eccentric to the spring axis, both the spring and the projectile flange are closely confined by the adjacent guide ribs to lie along the guide axis. Obviously, the smaller L30.4, the greater the range and accuracy; alternative release mechanism which reduce or eliminate such eccentric loading of the ESE are described later as Examples. When the RE engagement arm contacts the intermediate flange 3, other considerations, in addition to increased force, may also come into play, namely column buckling in the core zone 5.3 adjacent the proximal flange. For minimal buckling under compression of high-power springs, the length of this "necked down" zone must be kept as short as possible. The diameter of this core zone adjacent flanges 2 or 3 is indicated by D5.3; in general, the length is in the range of 0.7 to 1.5 times its diameter.

3,0 Energy Storage Element (ESE). One of the key elements of the present invention is the energy-storage unit. This component provides, i.e., stores and delivers, energy to drive the tethered projectile: (a) in a controlled trajectory and (b) in a controlled range of velocities. Energy is stored into the ESE during the process of inserting the projectile; this causes its elastic compression along its axis. The energy storage process is completed when the engagement arm of the release element engages a predefined transverse flange of the projectile near its proximal end. Once engaged, the insertion energy is stored and available from the compressed ESE, for ejecting the projectile upon actuation of the release. The ESE may be any known type of fast-release elastic element with mechanical characteristics appropriate for the amount of energy to be stored, e.g., a linear coil spring with a stiffness which exhibits a "spring constant" value over the compression range used. Likewise, the ESE may be a unique compressible component with a predetermined force-distance signature including non-linear or discontinuous regions, e.g., as can be obtained by graded, tapered, composite, multiple and/or nested springs. The range of length compression of the ESE for different embodiments is in the range 10–200 mm. The maximum force range required for compressing the ESE is in a range which is comfortable for typical adult humans, i.e., approximately 0.5 to 100 N. The distal portion of the ESE interacts with the proximal portion of the projectile while the proximal portion of the ESE is coupled to the proximal arm of the ESE support.

3,1 ESE Types/Properties. Generally the ESE element is characterized by its size and stiffness. The size relates to the lengths in its free and selected compressed states; the ESE is also characterized by its wire diameter, external dimensions and shape, i.e., a cylinder shape would be specified by OD values for its free and compressed states. The stiffness or spring rate may be characterized by the force increment which must be applied to change the length by a predetermined length increment. For the present invention, the appropriate length change is in the range 10–200 mm; this assumption defines the free and compressed length range. The maximum hand-to-hand compression force which can be comfortably applied by an adult human is in the range 50–200 N. This factor indicates ESE rates in the range 0.25–10 N/mm. ESE elements may be of any known technology ranging from a simple wire-coil compression spring to a gas-filled elastic bellows. The ESE element may also be a composite of several coupled elements such as springs of variable/different diameters/characteristics; such composite ESE elements could be used to provide tuned force-distance curves and for increased resistance to spring buckling, which compromises accuracy and range and introduces undesirable vibrations during the release process.

3,2 Coil-Spring Embodiments of ESE. FIG. 2c indicates schematically several of the defining physical characteristics of a compression-spring ESE. The free length L30 is in the range 60–224 mm. The solid length (L20.1), i.e., the length when the coils just come into physical contact, is in the range of 25–80 mm. The ID is in the range of 4–10 mm; the OD is in the range of 6–12 mm. The rate is in the range of 500–1500 N/m. The low-power stage requires a compressive force of approx. 50–70 N and the high-power stage requires a force of approx. 60–90 N. The coil pitch is in the range of 2–5 mm; the wire diameter is in the range of 0.7–2 mm. The ratio of free length to OD is in the range of 6–20. parameters in these ranges, the compression spring is driving the projectile during most of its travel path along the length of the guides. Since the typical compression spring ESE is relatively long, it is subject to buckling during compression and its proximal OD must be supported by the stabilizer ribs 52 to prevent vibrational effects and offset forces during release. The distal end of the spring ESE follows the projectile along the projectile guide ribs 51; these elements provide further stabilization of a coil-spring ESE during release.

3,2,1 Coil-Spring ESE Elastic Parameter Optimization. The elastic characteristics of a compression spring ESE are related to the wire size, coil diameter, the coil pitch and the elastic properties of the wire after winding and post-winding heat-treatment or peening. Coil spring embodiments may combine a wire diameter and a coil count which allows engagement of the intermediate projectile flange before the spring ESE reaches its solid length.

3,3 Coil-Spring ESE End Design. Coil springs may be obtained with a number of different end types/styles. For various embodiments of the present invention, flat-ground ends may facilitate optimal engagement to the projectile and coupling attachment to the RE proximal arm.

3,3,1 Proximal end. Alternative proximal-end types include: long square-end hook over center, side/center eye, or straight end/annealed, may also be used, provided the particular end-style is accommodated by a mating feature on the RE coupler. Embodiments with a cone-helix proximal end offer advantages re interference with spring guides for certain choices of pivot axis position. Illustrative ESE embodiments with sections of different geometry/properties are shown schematically in FIG. 2e. This figure illustrates a variety of alternative coil-spring ESE embodiments wherein the spring may be prepared from zones, sections or portions of different geometry, i.e., graded/stepped materials/wire diam./wire yield strength/free winding pitch/free OD. As indicated, the zones may be formed integral or prepared from joined components by known bonding methods.

3,3,2 Distal end. The distal spring end may be selected from a number of styles/forms including: cut, flattened, ground, etc., provided there is a mating feature on the proximal tip of the projectile. Alternative embodiments of the ESE distal end may be prepared with an attached tip element adapted to center the proximal end of the projectile into a surface recess; such tips may be prepared from hard, smooth, lightweight materials such as polymers, alloys or ceramics.

3,3,2,1 Coil-Spring ESE Distal Insert. FIG. 2f17 illustrates one "threaded" insert embodiment, 31, which is retained by engaging the distal ESE coils and provides a conical distal recess defined by angle A31. The recess, assures that the proximal projectile tip is centered with the ESE axis. The pitch of the helix groove, L31, may be adjusted to match with the free pitch or a partially compressed pitch value; the groove width may be in the range 1–1.5 times D30, the ESE wire diameter. The groove depth may be 0.2–0.9 times D30; this parameter is controlled by D31.2. The end flange diameter, D31, is comparable to the projectile flange diameter. Together the pitch, groove width and length, L31.2, may be adapted to provide axial insert attachment with any type of spring-end configuration, i.e., the end insert does not induce angular offsets in the ESE in either its free or compressed states.

3,4 Coil-Spring ESE Geometry Factors. The ESE OD, pitch, free length and solid length are key parameters in the present invention. Embodiments may be prepared with different-pitch zones, especially at the proximal end to provide additional flexibility for off-axis displacement as may be required for certain choices of pivot-axis position. The barrel guide tube length must be sufficient to enclose a spring ESE at its free length. An important design aspect of various embodiments is to select a combination of physical dimensions, wire and spring winding parameters such that the spring is never compressed regularly to its solid length. Such overstress may result in premature degradation of range and serious loss of accuracy.

3,5 Spring-Release Dynamics. At maximum compression, the proximal end of a spring ESE may be displaced only the amount of the local radial gap between its OD and the spring-stabilizer ribs. In many cases, the proximal spring portion may be in firm contact with said ribs just prior to release. Embodiments with a solid film or layer surface lubricant on one or both surfaces will allow more useful energy to be recovered from the spring. Embodiments with close stabilizer radial gap tolerances will suppress more of the lateral and torsional dynamic oscillations associated with rapid release of a coil-spring ESE.

3,6 Projectile Interactions for Coil-Spring ESE. This section considers the interactions which occur upon release of a charged ESE, namely torsional, longitudinal and axial dynamic oscillations, and possible resulting effects which may degrade the range and accuracy of the projectile.

3,6,1 Compression Stage. As the axial force increases to compress a spring-ESE, the distal spring end will be brought into intimate contact with the proximal tip of the projectile, e.g., the centering feature will seek the center of the spring. Tether bight and knot tails may be damaged in this process if they are not safely enclosed in a recess or notch.

3,6,2 Release Stage. Embodiments with hard, smooth, burr-free mating surfaces will provide highest power conversion into the projectile.

3,7 Coil-Spring ESE Materials/Mechanical-Thermal Treatments/Surface Finishes. Many known processes can be used to enhance ESE performance for coil-spring ESE embodiments of the present invention. Known heat-treatment methods may be used for certain embodiments to increase the yield strength of springs made of typical alloy-steel compositions or of copper-based alloys. Such treatments may be beneficial in certain embodiments for which the maximum spring compression produces exceptionally high stresses and results in compression set over a period of use. Likewise known surface work-hardening, e.g., by use of shot peening or other surface deformation processes can increase the yield strength and thus resistance to compression set. Steel spring embodiments may be prepared with a variety of known surface finishes or treatments including: (a) protective metal plated films, e.g., Zn, Sn, Cu, Ni, etc., (b) protective conversion coatings, (c) protective electroless/electrochemical/anodic coatings, (d) organic coatings and (e) solid or liquid surface lubricant layers. Coil-spring ESE embodiments may be prepared using of a composite filament of two different metals/alloys, a metal and a cermet, a metal and a ceramic or of two ceramics. A coil spring wherein an alloy is coated with a ceramic, e.g., pyrolytic carbon, is an example of a composite.

3,8 Spring Constraint Factors. Embodiments with long coil springs are subject to spring buckling during compression and must be supported. The spring supports must provide radial tolerance for spring-diam. changes due to compression and allow for off-axis movement due to the specific type of coupling with the RE and the position of the pivot axis.

4,0 Projectile Guides. For accurate projectile placement, the present invention includes a guide tube with a set of longitudinal internal ribs. The function of the ribs is to provide low-friction guidance for the projectile as it is accelerated through the barrel tube. Guidance is provided by light, sliding, line contact between the transverse flanges of the projectile and the curved ends of the ribs. Embodiments may be prepared with different numbers of guide ribs; the radius of the guide rib contact zone is in the range of 0.5 mm. At any selected point along their length, the tips of the ribs define a contact circle which defines—functionally—the ID of the guide tube at that point. For high accuracy and maximum projectile range, the contact surface along the length of the guides should be a cylinder of constant diameter and a single center point, i.e., variations of radius and the position of the center point along the length must be held within a small tolerance circle. Warpage of the guide tube or inaccurate forming operations for the ribs, which can result in a large ID-center tolerance circle, will severely impact range and accuracy. Therefore it is important to chose materials and choice of manufacturing/assembly operations which are consistent with this fundamental requirement.

Figure 3:
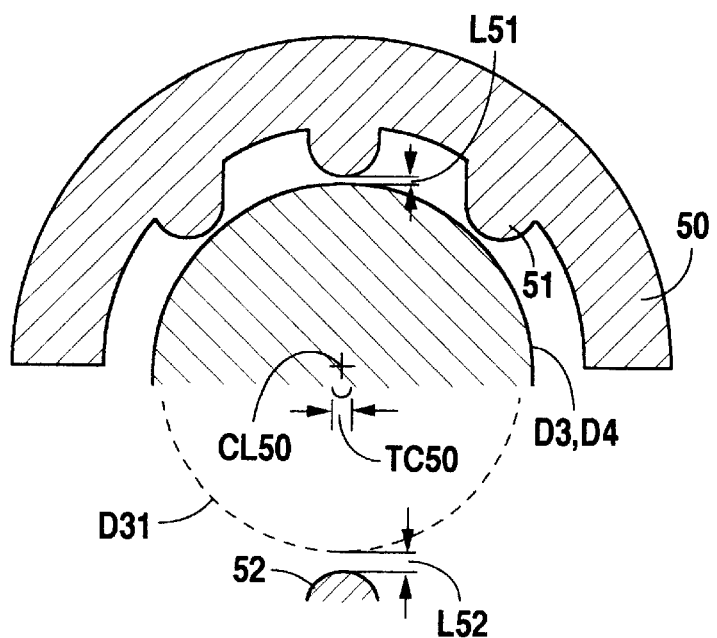
FIG. 3 is a composite, 2-part sectional view showing the relationship of the guide ribs to the projectile flanges and the stabilizer ribs to the ESE or coil spring OD in the compressed condition. The upper portion indicates the centering of the flanges 2 and 3 within the guide ribs on the ID of the guide tube. The lower portion indicates centering of a compressed spring OD within the stabilizer ribs.
Figure 4:
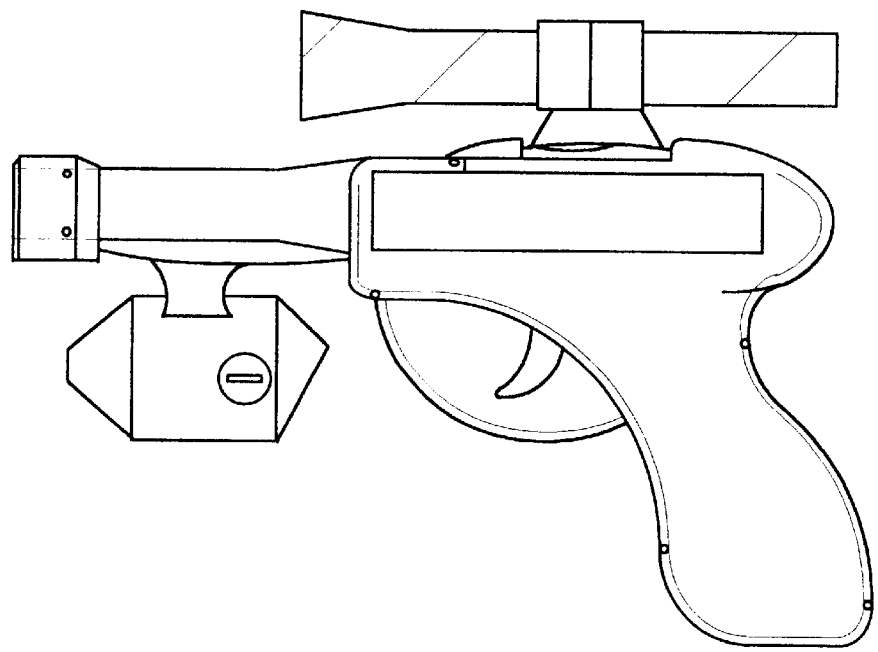
FIG. 4 is an overall view of a pistol-type embodiment showing an optional aiming device and spinning reel mounted on the basic housing.

4,1 Projectile Guide Arrays. Embodiments of this invention may be prepared with different counts/angular spacings between projectile guide ribs. The rib count may vary from 3 to approximately 6 depending upon the application. The angular spacing and angular orientation, i.e., radial or chordal, of the ribs may also be adjusted to suit the application. FIG. 3 illustrates the projectile guide ribs as 2 mirror-image ribs extending from the ID of the tube 50 in a chordal direction re the contact circle and spaced on each side of a radially-extending guide rib. This sectional view shows only one half of the guide tube; a mirror-image set of guide ribs forms the opposite side. While this particular combination of radial and chordal guide ribs is convenient for manufacture of the housing guide tube as molded halves, alternative embodiments of the present invention can be prepared with: (a) 3–10 total guides, (b) all radial guides, (c) all chordal guides (d) different numbers of projectile guide ribs and stabilizer ribs or (e) different patterns or combinations of radial/chordal guides than as shown. The lower portion of FIG. 3 shows a partial sectional view and one of the stabilizer ribs adjacent the proximal zone of the ESE. For embodiments wherein the housing is made as two mating halves, the ESE stabilizer ribs will be similar in number, size and placement to the guide ribs, i.e., formed as continuous, connected ribs formed integral with a molded housing. Other alternative mating-half housing embodiments with: (a) a different number of stabilizer ribs and (b) different stabilizer rib patterns/placements may be used to achieve better control of spring buckling. Still other alternative embodiments may be prepared with the guide and/or stabilizer ribs prepared as either (a) mold inserts or (b) separate inserts inserted/fastened/bonded into mating halves.

4,1,1 Totally Fixed-Integral Guide/Stabilizer Ribs. Typical embodiments of this invention will include all ribs, i.e., both guide ribs and spring-stabilizer ribs, formed integral by an injection molding operation. However, alternative embodiments may be prepared with one or more mold inserts for either or both functions; these ribs will thus be integrated and non-removable from the body or barrel tube. Mold inserts may be either a high-melting polymer, e.g., polysulfone, fluoropolymer, PTFE, etc.,. or a metal or ceramic sub-assembly consisting of ribs and/or attached cage rings.

4,1,2 Totally Removable/Interchangeable/Modular Guide/Stabilizer Ribs. Embodiments of this invention may be prepared with all ribs, i.e., both guide ribs and spring-stabilizer ribs, formed separately, inserted as a secondary manufacturing operation and secured in proper alignment by known fasteners. This approach permits exchange/replacement of guides/stabilizers by the user or a technician with special jigs as might be needed due to wear. Further, such embodiments may facilitate exchange of a functional assembly including the projectile, the RE, the ESE and all guides/stabilizers as a module exchange. Likewise, such embodiments would permit exchange of only guides and not stabilizers.

4,1,3 Combination Fixed/Removable Guides/Stabilizer Components. Embodiments of this type may include molded integral and modular inserts for either or both guides or stabilizers as described above. Further, the fixed or molded-integral guides/stabilizers may be mold inserts.

4,2 Projectile Guide Geometry/Alignment Tolerances. FIG. 3 indicates two important centering parameters which are inherent in any coil-spring embodiment of the present invention: (a) centering of the guide ribs about the projectile flanges and (b) centering of the stabilizer ribs about the compressed-spring OD. Optimization of the average radial gaps, L51 and L52 assures efficient conversion of the stored energy into kinetic energy of the projectile directed along the desired trajectory. Ideally, the rib contact profile must be a circle of a single diameter along their full length; further both the ribs as well as the tube must be perfectly straight. In actual manufacture for two mating halves, a number of complex and interrelated factors must be considered to achieve this goal; from experimentation, the most important have been found to be mold wear, polymer injection/cooling techniques and assembly methods/fixtures. If one imagines a plot showing the centers of several successive rib-contact profiles taken at 1-cm intervals along the guide tube, they should all lie within a limited area defined generally as the "tolerance circle". This concept is shown as TC50, which is the diameter of the circle which will just enclose all the profile-circle centers along the length of the tube. The diameter of this "tolerance circle" for two assembled halves reflects the tube straightness and assembly fit-up of the parts. Smaller values of TC50 are preferred; experimentation has shown that TC50 values in the range of 0.2 mm can be achieved with reasonable care. For an ideal, perfectly-straight projectile with perfectly-circular flanges, the radial gaps re the guide ribs, L51, will be constant along its travel path through the tube, provided it is perfectly centered at every point. Experimentation has shown that L51 values in the range 0.1 mm can be achieved with reasonable care.

4,3 Projectile Guide Rib Materials/Coatings/Finishes. Ideal guide ribs would exhibit low coefficients of sliding friction against the projectile flanges. Embodiments may be prepared with: low-friction polymer inserts, e.g., PTFE, permanent low-friction surface coatings or renewable low-friction surface treatments/polishes.

4,4 Projectile Guide Surface Properties. Either molded-integral or modular-inserted projectile guide ribs of the present invention may be prepared as embodiments with the contact circle enhanced by secondary line-reaming/polishing operations which produce a smooth/straight/ripple free line contact between the flange and the guide rib.

4,5 Other Projectile-Guide Details. Projectile guide centerline-axis alignment (along the bore) and projectile-flange clearance tolerances may be optimized with respect to a specific ESE, i.e., projectile flange contact surfaces, surface finish, and designs for uniform linear stiffness may reduce or eliminate dynamic warping of internal barrel guides with resulting irregular deflections and chaotic resonance of ESE during expansion. Such movements or chaotic deflections may cause unpredictable launch of the projectile thus indeterminate or misleading point-of-aim estimation on the user's part. Other effects of inadequate optimization are loss of efficiency and degrading usable range. Inconsistent and unpredictable launch orientation contributes to unpredictable axial friction, loss of induced spin, warping of the projectile and other factors.

5,0 Sliding-Friction Effects. Sliding resistance values in the present invention are related to the shape/smoothness/presence of surface lubricant films as well as the normal force between the contacting surfaces. There are a number of frictional resistance possibilities in the coil-spring ESE embodiment. Ranked in decreasing order of importance the resistance factors include: (a) projectile flanges sliding along the radial ribs of the projectile guide, (b) coil-spring sliding resistance along the projectile guides, (c) coil-spring sliding resistance along the spring stabilizer ribs and (d) disengagement resistances between the spring and the proximal end of the projectile.

5,1 Coil-Spring ESE Stabilization Factors. The present invention is further characterized by exceptional control and optimization of the stored energy transfer from the ESE to the projectile. These aspects have never been addressed in simple catapult and hurling-mechanisms which were not expected to have high accuracy or a repeatable trajectory. To achieve reproducible trajectory, the first goal is to adapt the mechanism, especially the release element, the energy store, the guides and the stabilizers to direct the force vector closely along the desired axis of projectile travel. A straight-line ESE must be supported and stabilized to constrain any feasible lateral deflection and to damp possible harmonic vibrations/oscillations which may be excited during its expansion phase. Further, the ESE must be aligned and mounted so that its force vector during release is kept as close as possible to the projectile travel axis; this function is accomplished by the stabilizers.

5,2 Interactions Between Spring-Spring Lateral Stabilizers for ESE. While a short, stiff, straight compressible element may require minimal lateral support to guide the force being applied to the projectile during expansion, longer and more-flexible elements may require lateral support to achieve maximum range and accuracy. The basic function of stabilizing ribs for the ESE is to assure that its force vector stays aligned with the axis of the contact cylinder defined by the guide ribs; an additional function is to prevent or damp inherent dynamic oscillations of the ESE which may be excited during its sudden expansion. If the ESE, especially a coil-spring embodiment, is fitted with a distal coupling cap, there may be interference and frictional effects related to separation from contact with the proximal tip of the projectile at the end of spring travel.

The present invention also introduces the concept of optimized clearance tolerances between the projectile centering flanges and the longitudinal rib guides. In addition, this invention is novel in its attention to first- and second-order dynamic, ballistic and fluid-mechanical factors which is now possible because of the existence of digital modeling algorithms. In the past some of these effects have not been well known or impossible to calculate using classic graphical or calculator methodologies.

5,2,1 Surface Coatings/Films (Lubricant, Wear Resistance). Known materials and methods may be used to reduce friction factors between the spring coil OD and the contact surfaces of the spring stabilizer ribs. Surface-film lubricants may be implemented for a range of polymer compounds having neutral effect on materials while lubricating projectile and ESE surfaces. Lubricants such as graphite and silicone show notable improvements in device action while increasing performance. Coatings and/or platings of materials having complementary lubricating properties may be applied to guide ribs, projectile and ESE components.

5,3 Radial Gap Between Projectile-Projectile Guides. The simplest embodiment of projectile guides is to have a single target radial-gap tolerance for both flanges and the entire length of the radial guides. Other embodiments may be prepared with length-graded target radial-gap tolerance values. Tolerance between barrel guides and projectile flanges are based upon "average tuning" for a specific application. The required tolerances are dictated by the type and diameter of tether and the preferred accuracy desired. Formulations for tolerance selection allow approx. 1% over D3 or D4 considering the combined diameters of the projectile flange and tether material. Where multi-fiber tethers are used, the tolerance may be increased to a factor of 1.25%.

6,0 Tether & Tether-Coiling Factors/Effects. The function of the tether is to provide a means of pulling a wire or cable across an inaccessible space. This process may involve two stages in the case of heavy, single wires or light cable, i.e., an original monofilament tether with a rupture strength in range 50N may be used to pull a heavier wire or snake by which a stiff cable or tube may then be pulled. Thus, there is probably limited need for the tether to be able to sustain a force greater than about 50N. Tethers may be any known monofilament or braided line of appropriate strength. The tether store may be any known type of line store including conventional reels, off-the-end or spinning reels, basket-type coilers, etc. For maximum compactness and ease of use, a small spinning reel can be attached to, or optionally used alongside, the present invention.

6,1 Tether. The tether is indicated generally as 9; typically, the tether is a resilient line with a diameter in the range 0.05–1 mm. A length of tether in the range 5–30 m is held within the store. A wide variety of synthetic and natural tether materials have been evaluated for various applications; these have included conventional round-monofilament and round-braided multifilament forms of many polymers including polycarbonate, polyamide, polyolefin, PTFE, polyimide; generally, monofilament tether is useful for supporting load forces in the range 15–100 N. Similarly, fine wire or fine braided-wire-cable tethers have been used for specific applications where higher tensile strength is required, i.e., 100–200 N.

6,2 Tether Properties. Critical properties include: strength, stiffness, spool-set resistance, diameter, color, luminescence, length markings, solvent resistance, optical properties/reflectivity, e.g., aluminum film.

6,2,1 Cable-Wire Installation. Selection of tether material may be based on specific applications and environments where tether material is adequate and appropriate for use. Typical tether characteristics would require materials which have nominal chemical resistance and stiffness while maintaining maximum spool-set resistance and strength. Visible colors and distance markings may be included which allow ease of sight of tether while allowing user, via length marking symbology, a mechanism or means to determine length of tether expended. In cases where device is used in corrosive or caustic environments alternate chemical-resistant tether material may be used.

6,2,2 Conductive, Magneto-Resonant, Optical, and RF Conductive Tethers. It is conceivable that the present invention may be used to string a medium between two points for the purpose of establishing a connection between two locations or to establish an orientation for a light or current conductive filament. For this purpose, the tether may be comprised of a myriad of materials having the desired properties. The device may be used to project a transmissive or conductive media from one point to another whereas the tether may be infiltrated with or formed of a electrically-conductive wire strand allowing the placement of conductor medium or RF antenna. Other potentials include, but are not limited to, the placement of an optical fiber to connect two video devices, digital computing/communications devices, laser transmitter/emitters/receivers, and the like. It is conceivable that law enforcement, intelligence, military, and covert operations may find applications where the device is used to project a specific form or composite of filament between points, into hostile environments, or vertically into trees or other locations where RF antenna transceiver could be operated.

6,2,3 Alternative Tether Materials. A wide variety of known tether candidates are suitable for special applications, i.e., nylon/polyamide, polyester, polyimide, PTFE, fluoropolymers, alloy wire, etc.

Figure 6:
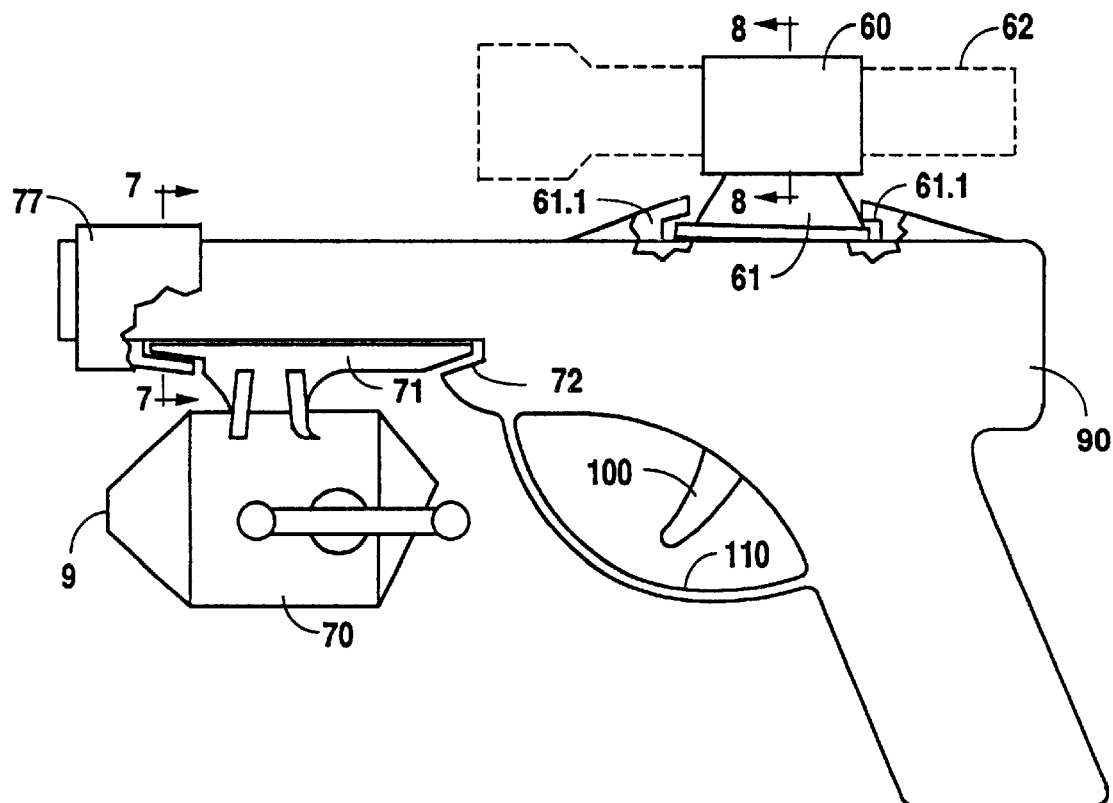
FIG. 6 shows alternative, optional targeting and illumination and line storage devices as well as their related, optional adjustable mounts which may be attached onto or integrated into the housing.

6,3 Spinning Reel Tether Store. FIG. 6 is a front view of one embodiment of a pistol-type housing. This figure shows the placement of an optional tether line store 70 with its base 71 mounted to the guide tube exterior by means of a muzzle ring 77 and secured into the housing by means of a formed-integral, matching slot 72. A partial cut-away section of the muzzle ring reveals the mating recess for the forward base tab of the line-store base. An optional, aiming ring 61 is also shown; for this embodiment, the ring is permanently attached during assembly by capture of its base tabs into mating recesses 61.1 formed integral in the top surface of the housing halves. For this embodiment, the line store is depicted as a known, small-size spinning reel; other embodiments have been prepared with alternative known types of reels, including conventional types, i.e., with the winding-spool axis to the projectile axis or line of travel. The transverse cutting plane and view direction for a sectional view of the muzzle ring is shown as 7, referring to FIG. 7. The location of the parting line 50.1 and longitudinal guide ribs for molded guide-tube halves 50 is clearly shown in FIG. 7. In FIG. 6 a portion of the muzzle ring is shown in a cut away view to reveal the interlocking of the tip of the tether-store base 71 and the matching pocket in the ring 77. Similarly, the end portions of the housing adjacent the base 61 of the targeting ring 60 are shown in cut away views to illustrate matching, interlocking housing-socket features 61.1 and the ring base 61. To maintain alignment of the muzzle ring about the guide tube axis, it is provided with two short opposing radial ribs, 77.2, on its ID; these protuberances seat with a light interference fit into matching OD recesses on the guide tube surface.

6,4 Tether Storage Systems (TSS). A variety of known coiling/uncoiling devices can be used as TSS embodiments. Tether may be stored on known line-holding or reel-like devices which may be: (a) contained within or (b) mounted on/to the present invention. Alternatively, tether may be stored or placed external to the device of the present invention in a selected position relative to travel direction or trajectory. Further alternative tether-storage arrangements include a hollow projectile containing length of tether material helically wound and stored within the confines of a tubular or semi-tubular projectile shank. TSS may be in forms ranging from a simple fishing reel to a specially-designed high-speed unwinding device. Typical applications may require an unwinding device in which the tether material is pulled from the side/end of a spool or other storage system wherein the "windings or foldings" are positioned re the guide axis or trajectory. Other alternative TSS systems may be used which fold, cross-loop, or otherwise "store" the tether material in an unconventional array which allows for rapid, low-friction-drag disbursement of tether material.

6,5 Tether-Release Parameters. The TSS must: (a) release internal stresses related to tether-rewind pretension within the tether material and allow it to become "relaxed" and (b) release spool play-out clamps so that the tether is in a freely-distributable state of storage just prior to ESE release. These releasing steps may take place within a time period ranging from up to minutes before—to 5 milliseconds after—the RE mechanism is released and projectile begins travel outward through barrel guide ribs. The typical applications configuration would allow the user to disengage the locking mechanism manually, i.e., trigger actuation, thereby placing the tether material in an "armed" state before projectile is unlocked and released. Alternatively, a spool-unlocking or actuating device may be integrated into the present design; for this embodiment, insertion of the projectile into barrel guides may be configured to cause unlocking of TSS locking mechanisms so that projectile loading and TSS unlatching are performed as a single combined action.

6,5,1 Reduction of Spool-Set & Loopy Tether Air-Friction Effects. For most polymer tether materials, being wound onto a rigid cylindrical spool under modest pretension in the range of 10–20% of the rupture load will cause creep in times as short as a few minutes/hours, i.e., slow plastic deformation such that the tether will take on a permanent curvature related to the spool radius. In usual cable-pulling activity, the stored internal tether stress due to rewinding under heavy resistance can be significant. An additional problem is a result of temperature change, i.e., if the pretension-wound tether-spool combination is subject to cooling in the range of 20 deg C. below the winding temperature, spool set due to tether thermal contraction can become a serious additional problem. Known methods for removing spool set, as practiced by fishermen, may be utterly unsuitable for cable-pulling technicians who have to work in confined spaces. Polymers with higher physical properties, i.e., creep strength, elastic modulus, deformation temperature, RT yield strength are highly preferred. Improved strength and stiffness can be achieved by selecting tethers such as metal or ceramic, including glass or carbon/pyrolytic graphite fibers, which have inherent deformation/creep resistance. Another spool-set resistant alternative embodiment may be composite tether with a stiff core and a strong polymer coating layer. TSS devices with: (a) a compliant, low-friction surface layer under the first winding course and (b) a larger spool diameter are additional alternative embodiments. Rewinding with minimal pretension and avoidance of temperature transitions after rewinding are practical measures to reduce such problems. Tether with a low-friction surface finish and/or renewable lubricant coating is another alternative embodiment which will reduce spool set by reducing friction between the spool surface and coils or between coils themselves. Still another alternative embodiment may include a pie-segmented spool core with mechanical or elastic-drive devices to cause it to contract a predetermined radial amount with each course or turn of tether which is wound.

6,5,1,1 Retrieval and Rewinding as Separate Operations. Two-stage TSS embodiments which separate the process into (a) first stage of heavy tension, i.e., pulling a cable followed by (b) a second stage of rewinding the tether onto a receiver spool under controlled, light pretension may be employed for selected applications.

6,5,2 Torque-Related Tether Coils & Off-End Unwinding. All known "spinning reels" incorporate a reel mounted at such orientation so that its spool axis—and the windings of the line—lie parallel to the axis of the rod. As the line is unwound over the end, torque accumulates in the free length between the projectile and the fixed spool. This torque manifests as "loopy tether" with resulting increases in air resistance and other destabilizing effects upon the projectile trajectory. Alternative embodiments of the present invention may be prepared with tether play-off devices which do not introduce this highly undesirable effect. A further alternative embodiment is to induce a complimentary "spin" on the projectile which just balances the torsion induced by off-end unwinding. Still an additional alternative embodiment is to utilize rewinding unwinding devices which do not induce rewind/unwind twist into the tether, thus, torsional energy is neither stored nor released.

6,5,3 Tether Coil Play-Off Resistance. Rapid movement of tether coils against the surfaces of the TSS device and against other coils accounts for a significant amount of resistance to the flight of the projectile. Alternative tether embodiments with the following properties will reduce these resistance contributions: (a) hard-smooth outer surface, (b) low-friction solid surface films and (c) surface lubricant layers, or coatings.

7,0 Projectile Flight/Trajectory Factors. The trajectory of a tethered projectile is influenced by several factors: (a) momentum as it emerges from the barrel guides, (b) initial tether pull-off resistance, (c) progressively-increasing air friction resistance and oscillations due to a trailing length of "loopy" tether, (d) gravity and (e) projectile air resistance. Early hurling inventions were made long before it was realized that a projectile can be characterized by its centers of mass, lift and drag. These factors are important in achieving stable flight of javelin- or harpoon-like projectiles; only recently have efficient digital means to model specific projectile shapes and various dynamic trailing-line parameters been available.

7,1 Air Friction Factors for Projectile. Air friction grows increasingly stronger as more tether is introduced into the air, i.e., typically with more coils—due either to torque or spool set—are being dragged behind the projectile. If the projectile axis lies substantially parallel to the trajectory, its air resistance will be minimal due to its small section area. If the tether is towing an array of 5–10 small loops, their total section area, i.e., (tether diam×coil circumference×coil count) may be small in comparison to the section area of either the shank or the distal eye of the projectile and they may not dominate drag effects. However, when or if the projectile is towing 25–50 loops, their bluff body areas are comparable and overall drag is dominated by "loopy tether".

Embodiments of the present invention which present no more than a few loops over the working distance may include optimized tether and advanced TSS systems as described above.

7,1,1 Projectile Momentum Patterns. As the projectile leaves the barrel guides, the initial line-of-flight is modified by forces required to pull off the tether from the TSS. As the projectile leaves the barrel guides it is trailing a short free length of tether (approx. 150 mm) attached to its proximal tip. In many embodiments the TSS is positioned approx. 20–30 mm above, i.e., along the Z axis of the barrel guides; this results in an off-axis jerk torque to the projectile when this slack becomes tight. This initial jerk torque may cause severe "pitching" of the projectile about its center of mass. If later stages of the release process are also jerky, additional torques—which may include roll (rotation about the projectile axis, i.e., x-axis), pitch (projectile rotation in the x-z plane about the y-axis) and yaw (projectile rotation in the x-y plane about the z-axis) may result.

7,1,2 Static/Dynamic Center of Mass (Projectile+Tether) Because of the mass of the distal eye of the projectile, its center of mass is located somewhat distal of its longitudinal midpoint, i.e., approximately at a distance of 30–40% of the length of the projectile, from the distal tip of the projectile. This balance point, in conjunction with the tether's slight pull on the proximal end keeps the dart oriented with distal tip towards the path of flight thereby eliminating any tumbling or other chaotic flight characteristics with respect to the projectile's orientation vs. flight path. The slight tension of the tether on the proximal end of the projectile, torsional unloading complementary to the spool device's direction of wind, limited tolerances of the projectile's fit within the barrel, and symmetrical axial shape all perform together in reducing vortex shedding during flight. Ideally, the static tether is in the form of a catenary curve trailing the projectile; its center of mass is at the midpoint.

7,1,3 Initial Tether Constraints. The first stage of the trajectory can be described as a projectile of mass in the range 5–10 grams moving initially at a velocity of 25–50 meters/sec and pulling off 10–25 m of tether from the TSS. Typical tether has a mass of about 0.1–0.3 grams/meter of length.

7,2 Dynamic Oscillations Due to Trailing Tether. If the center of mass of the projectile is in its forward-most portion, it will be less subject to fluid-mechanical oscillations in flight, e.g., wobbling due to vortex shedding. Intense dynamic vortex shedding is expected to occur on the larger-diameter coils closer to the TSS. Resulting force fluctuations are expected to induce both axial and longitudinal oscillations in at least the adjacent distal portion of the "loopy tether" which will in turn produce roll/pitch/yaw instabilities in the projectile.

7,2 Dynamic Oscillations Due to Trailing Tether. Similarly, if the center of mass of the projectile is in its forward-most portion, it will be less subject to fluid-mechanical oscillations in flight, e.g., wobbling due to vortex shedding.

8,0 Safety Latch for RE. In certain situations it may be desirable to charge the ESE at one location and then to carry the "loaded" device to another location. To prevent injury and damage due to unexpected or accidental release of the projectile, the release element, RE, may be fitted with a simple, secure and reliable locking mechanism. The mechanism may interact with the release element in a way which will not trigger the release process as the safety latch is being moved to the "off" position.

Figure 5A:
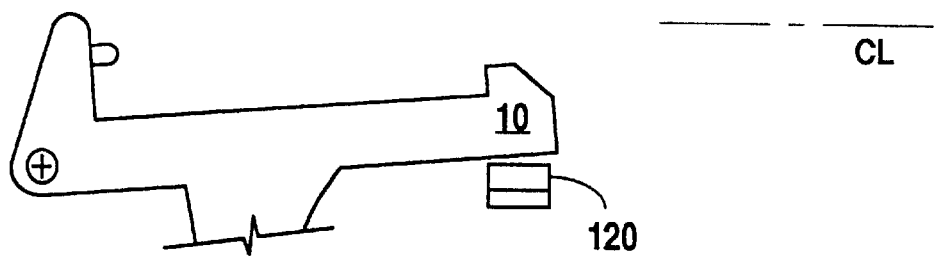
FIG. 5a is a front view of the release element in the engaged position and showing an embodiment of an optional, lateral, slideable safety latch which prevents release of the projectile once the spring is compressed.
Figure 5B:
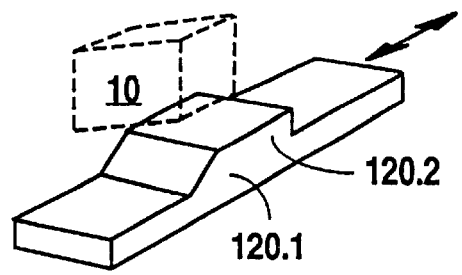
FIG. 5b is an isometric view showing this sliding-bar embodiment with a tapered wedge positioned in its locked position.

8,1 Sliding Bar Safety Latch Embodiment. FIGS. 5a and 5b show one embodiment of an optional transverse safety latch to prevent accidental disengagement of the release element. The sliding bar 120 is slidingly supported by positioning apertures in the housing. Because the latch has an enlarged center section, it is securely captured within the housing when assembled. The housing apertures are adapted to locate the wedge section so that it contacts the lower surface of the RE 10 when it is slid into engagement and allows the RE to disengage when it is slid into the off position. The thickness of the wedge section 120.2 is sized to hold the RE into maximum engagement with the projectile. The leading edge of the latching wedge, 120.1 is formed at an angle of approx. 45 degrees so the RE is urged upward into full engagement as the latch slides transversely, even if it is only partially engaged initially.

9,0 Targeting Devices. This section addresses various embodiments of targeting devices. Targeting devices may include one or more of: simple aiming/pointing systems, e.g., known firearm or archery sight configurations, optical-beam spotting systems, e.g., laser or collimated visible beams, collimated invisible radiation beams, e.g., IR, UV, electromagnetic fields, flight-trajectory or impact point markers and combination illumination-spotting beams, e.g., a focused flashlight.

9,1 Flashlight. Targeting Devices. For some wire and cable stringing operations, the technician may have to work in a low light level and simple visual pointing of the device of this invention is not sufficiently safe or accurate. Alternative embodiments may be provided with an additional attachment base for attaching a light-weight, removable optical aiming device such as a focusable, narrow light beam or a coherent-beam, visible laser. Battery power for such aiming devices can be provided by an extension lead from a belt-supported pack if integrated, miniature cells are too costly or do not provide adequate intensity.

Figure 8:
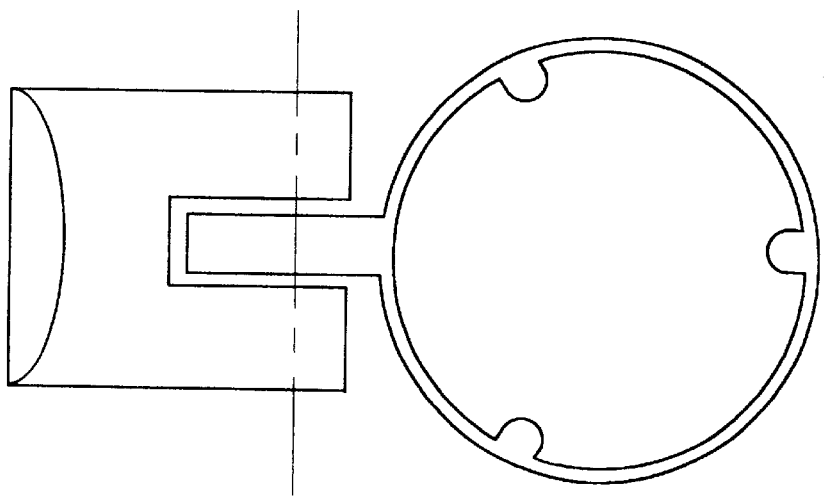

9,2 Targeting Ring. For situations where the light level is sufficient to see a simple type of "open sight", embodiments with a muzzle-mounted targeting ring may be prepared. Alternative embodiments provided with a laser beam or a focusable incandescent beam aiming devices can be inserted into the targeting ring 60 for increased ease of aiming in low light. The sectional view through the targeting ring toward the muzzle is shown in ; the ID of the ring is prepared with 3 optional, short radial ribs which are useful in centering the target zone and for providing a frictional grip on a an additional, optional, known, removable targeting device such as an incandescent light source, a laser beam source or a small telescopic sight. The transverse cutting plane and view direction for a sectional view of the aiming ring is shown as 8, referring to FIG. 8.

9,3 Other Targeting Devices/Attachments/Ext. Systems. Further, it is anticipated that known, compact ultrasonic, IR and magnetic-field aiming devices/systems can also be attached by the targeting ring 60.

10,0 Misc. Features/Accessories. Alternative embodiments may be prepared with one or more of the following optional features.

10,1 Optional Clip for Extra Projectile. FIG. 7 also shows an embodiment with an optional clip 77.1 formed integral with the muzzle ring which can be used to carry an additional projectile. The opposed jaws of the clip provide a tight, friction fit about the proximal flanges of the projectile and hold a spare securely and close to the housing so that it does not become an impediment to use. The ID of the spring clip, D77.1, is slightly smaller than the flange OD, D3 and D4. The spare projectile is inserted by pushing its proximal end into the clip and toward the muzzle; mounted this way, its distal loop lies "flat" and close to the housing side surface.

10,2 Optional Work-Area Light Clip/Mount. For some purposes it may be desirable to prepare embodiments which provide an optional carrier, clip or mount for attaching a work-area flashlight with a light-dispersing reflector to illuminate the immediate area around the technician.

10,3 Remote Triggering Attachment. For certain applications it also may be desirable to prepare embodiments which include mounting flanges/pins/bosses to securely couple a remote triggering accessory, e.g., ultrasound, IR, light-beam, laser, etc., which would permit a single operator to trigger the projectile from a point distant from the mechanism. Finally, it is anticipated that a known remote-control release mechanism can be used to actuate the projectile release for a device mounted by a clamp or tripod; these systems include: a flexible pneumatic tube, a pull cord, a light beam, a radio signal, etc.

Figure 9:
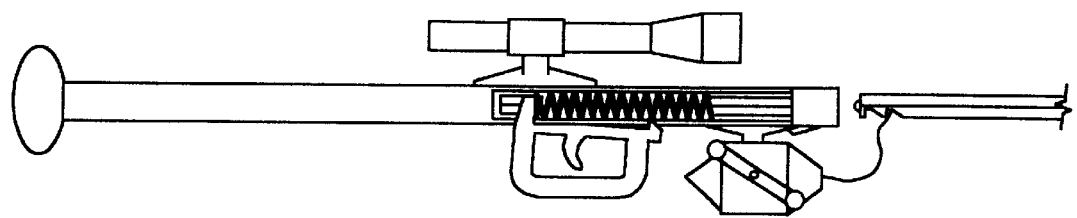
Figure 9A:
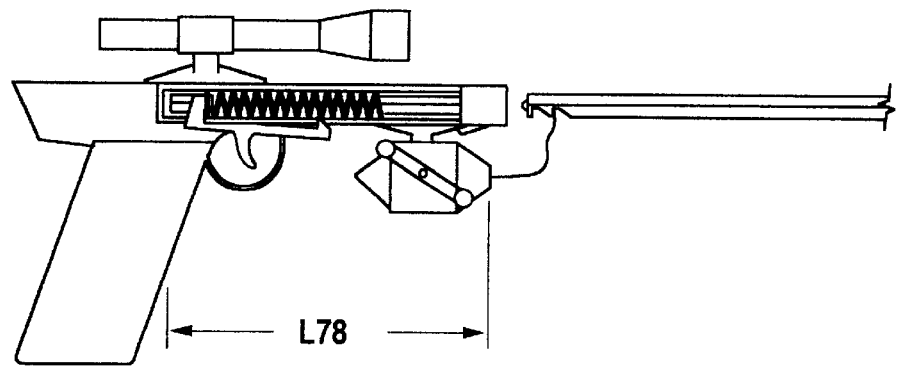
Figure 10:
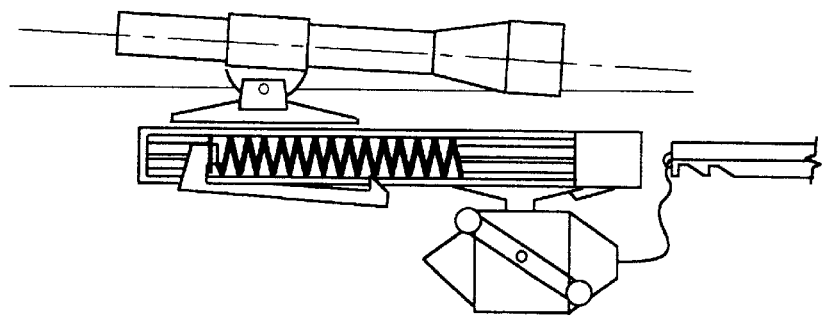
FIGS. 10–10A show a schematic view of: (a) an alternative mechanical, non-trigger, release element configurations to release the ESE from its compressed condition and (b) tiltable aiming accessory, either a scope, laser beam or focussing flashlight.
Figure 10A:
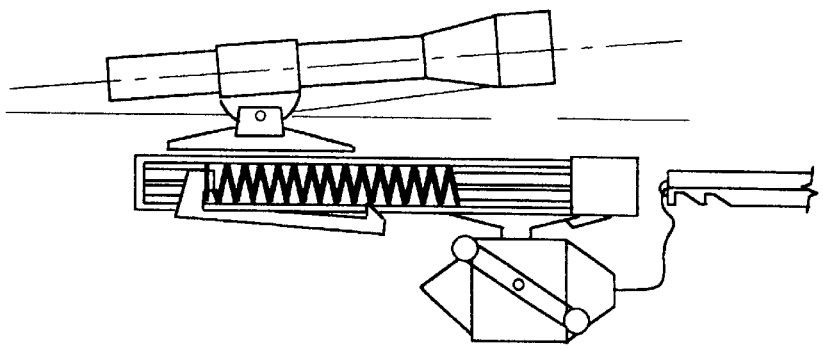

11,0 Housing and Handle Form. The form of the housing of a particular embodiment is important only to the extent that it provides a safe, compact support frame for the crucial mechanical elements. For some embodiments, such as those to be used for work on an elevated platform or ladder, good human factors, light weight and good balance are highly prized features. For many applications, especially tight quarters, the pistol form housing shown in outline in FIG. 6 is desired. For larger areas or longer distances, where recoil due to a long, high-energy ESE and heavy projectile may be present, a rifle-type housing with a known shoulder-stock profile can be added to the pistol-handle outline. Alternatively, the pistol-type grip shown in FIG. 6 can be truncated at the trigger-guard level with a horizontal flat plate provided with a known threaded socket or quick-lock device for mounting on a C-clamp or a tripod. FIG. 9 shows some alternative external case configurations including torpedo, T-square, stylized Olympic rifle, etc.,.

11,1 Embodiments with may be prepared with pistol- or carbine-form housings; these would be equally useful in many circumstances. However, compact, lightweight pistol-form housings are preferred for cases of a small hand-access port or confined spaces. The only functional requirement is that they provide comfortable hand/finger grip and a support housing for the critical mechanisms.

11,2 Alternatively, embodiments may be prepared in: (a) prepared in book-like format or (b) fitted for attachment to a C-clamp support or tripod.

Figure 11:
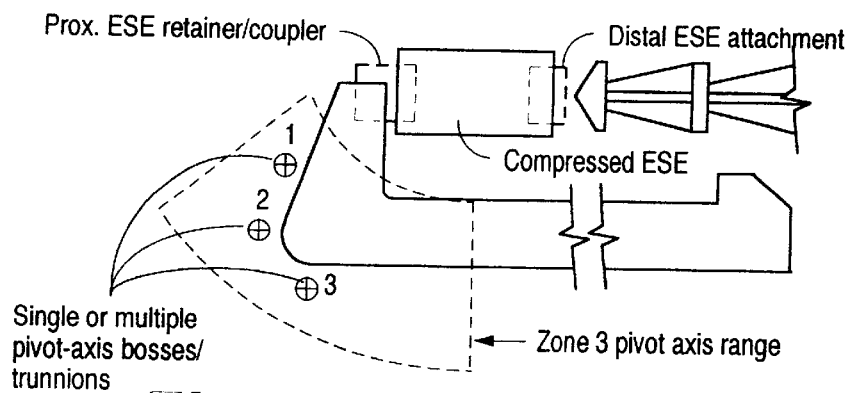
Figure 11A:
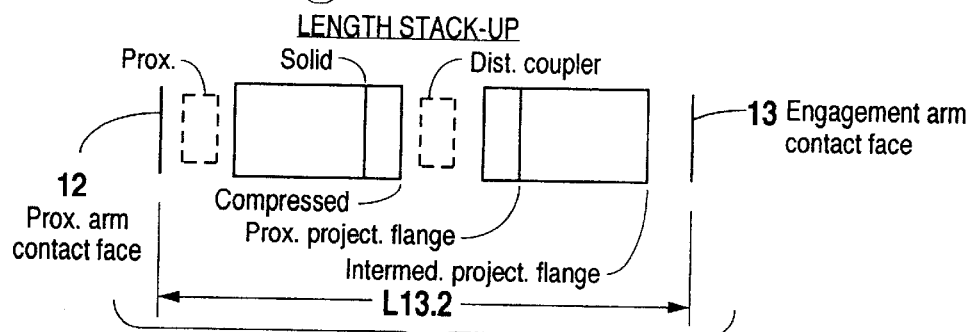

12,0 Stack-up Scaling Method and Design Considerations for Compression-Spring ESE. As has been indicated, the design process by which the present invention can be scaled into alternative embodiments is basically defined by the torsional stress limit of the spring material. Table 4 gives relevant spring design parameters for some selected commercial spring alloys. These properties can be used with known methods, which include iterative procedures to correct for the radius of curvature and the fact that the spring stresses are torsional, to scale spring ESE elements. FIG. 12 illustrates how the dimension L78, the spacing between RE contact faces, should be scaled to take into account all the unique RE and ESE features disclosed above. FIG. 11 illustrates how the length of the barrel and the projectile guides should be scaled to take into account all the unique RE and ESE features disclosed above. It is also anticipated that "modular" RE embodiments of this invention may be made with two or more pivot bosses/trunnions so that a single molded RE component may be used with different springs or housings, which include projectile guides/spring supports, and different barrel lengths. An alternative RE embodiment with 3 selected pivot axes is shown in FIG. 11; these may be either bosses or trunnions of different sizes each appropriate to a selected spring, projectile or stress loading. It is further anticipated that embodiments having larger spring OD values can be prepared by line reaming smaller guides or by using tapered springs.

DESCRIPTION OF PREFERRED EMBODIMENT

Many embodiments, each with special properties and performance which may be desirable for specific applications, have been specified in the foregoing disclosure. The use of normalized characteristic dimensions for the separate essential components, i.e., projectile, ESE, RE, projectile guides and ESE supports is the best way to generalize the design so that it can be applied to any application. This is accomplished by scaling all length dimensions, i.e., normalizing them as a non-dimensional ratio by dividing them by the free-ESE OD. The two right-most columns of TABLE 1 present scaled min and max dimensions which characterize the preferred range. Angular parameters are indicated in the column headed "typical"; where a single angular value is shown, it is meant that variations of up to 50% may be used for the typical value, provided the angle variation is consistent with dependent/related/mating features or parameters.

12,0 Embodiment Examples.

12,1 Alternative Polymers. Table 2 lists some alternative polymer materials which maybe used to prepare the projectile, release element, housing, muzzle ring and target-ing ring of the present invention.

12,2 Alternative Coil-Spring ESE Materials/Properties. Table 3 lists some alternative materials which may be used for the ESE. For the case of coil springs, improved characteristics may also be obtained by use of alternative composite coil-spring arrays, i.e., one or more springs of different characteristics/size together.

12,3 Pistol-Type Housing Embodiment. The values shown in Table 1 in the "typical" column represent the best mode for a pistol-type embodiment capable of accurate projectile placement up to distances of 10–15 m. A number of alternative compression springs have been carefully tested to find the optimal range of properties; these optimal ranges are found to be: OD=7–8 mm; solid length=28–35 mm; free length=100–120 mm; solid force=60–80 N; rate= 800–1000 N/m; wire diam=0.08–0.15 mm; wire type=music wire.

12,4 Example of Range/Accuracy Estimation. The performance of the high-power embodiment, i.e., its velocity, range and accuracy, can be illustrated with the following calculation which assumes no friction effects or other energy losses.

max force=(avg. spring rate)(spring length redn)=(850)* [(100−28)/1000]=61.2 N avg. spring force=0.5*(max force)=61.2/2=30.6 N stored energy in spring=(avg. force)*(compression distance, m)=30.6*0.072=2.20 Nm Assuming all stored energy is converted to kinetic energy (KE) of a 10 g dart (=10×10−3 kg)

KE=0.5 (dart mass) (dart velocity)2

This equation can be recast to calculate the initial, theoretical dart velocity, theo. dart velocity=(2 KE)0.5*(1/m)0.5 theo. dart velocity=(2*2.20)0.5*(1/10×10−3)0.5=2.35*10= 23.5 m/sec

When this dart is launched at a velocity of 23.5 m/sec parallel to a level surface at a height of 1.5 meters it will travel horizontally in the launch direction (assuming no air friction) until it falls to the surface under the acceleration of gravity.

The vertical distance, s, fallen is given by s=0.5at2 where t is the fall time and a is the normal acceleration of gravity at the earth surface, 9.8 m/sec2

Recasting, the fall time is given by t=[2sa] 0.5

For a height of 1.5 meter, the time is given by [2*1.5*9.8] 0.5=5.4 sec

During the flight time of 5.4 sec, the theo. dart travel distance is approximately 23.5*5.4=127 meters Considering that the avg. radial gap between the dart retention flanges and the axial guides is 0.01 mm, the axial alignment of the dart can be brought parallel to the underlying surface with an accuracy comparable with the tangent of the angle given by the radial gap divided by the barrel length.

For a typical barrel length of 100 mm the theo. non-parallel skew angle is given by the arc tan of 0.01/100=arc tan 1×10−4.

The calculated theo. skew angle is approximately 0.0057 degrees. According to this example, the nominally-parallel dart could thus be aligned at an angle smaller than 180 degrees due to the radial tolerance and would suffer a smaller range since it was aimed somewhat downward. For an angle of 0.0057 degrees and an adjacent side length of 126 meters the opposite side is comparable to the vertical correction distance; this distance is approximately 12.5 mm. A corrected theo. flight time would be [2*9.8*(1.5−0.0125)]=5.39 sec. This would shorten the range to 23.5*5.39=126.66 meters. This correction is, of course, much smaller than the possible errors inherent in the basic assumptions stated above and therefore negligible.

This numeric example, which is in agreement with experimental measurements for other selected combinations of property values, demonstrates the need for controlled tolerances in order to achieve efficient energy conversion and predictable accuracy.

12,5 Examples of Conspicuity Markings for Projectile and/or Tether Line. The ease and efficiency of line laying in areas of low illumination, dust/fog or darkness can be enhanced by the addition of enhanced-visibility agents or markers, in the form of bulk additives to the polymer compound or surface films/coatings. Such markers may be well-known distinctive paint or film colors such as "fluorescent orange" or a special device or surface coating which alters the perceived color or emits visible radiation visible to the human eye. It is envisioned that robust markers can be applied as paint or labels to the body of the projectile and coated onto at least the surface of the distal portion of the tether. Another alternative embodiment would be use of polymer additives to a molded projectile or during preparation of the tether line. Still another alternative embodiment would be surface application (by painting, spraying, dipping, etc.) of markers which dissolve or penetrate by diffusion into the surface of the polymer of the projectile or tether line. Alternative conspicuity markers may be reflective or emissive in nature provided they offer sufficiently contrast to the target background.

Conspicuity markers for the projectile must be sufficient in area, intensity and wavelength to be easily visible to the human eye at a distance of 10 meters or more. Projectile conspicuity markers may be provided on any surface portion; the preferred projectile marker area is in the range 1 to 1000 mm2 In the case of additives to the basic polymer, the area with conspicuity additives would be the entire external area of the part or the tether. In the case of a film or label applied after fabrication, the active area could range from 0 to 100%. The optimal locations for the projectile markers are on the longitudinal ribs and on the proximal-facing flange portions, which may be aligned toward the user for a straight trajectory, i.e., flight without rebound after striking the target. Markers for the tether line are ideally in the form of a flexible surface coating layer or a layer resulting surface treatment of the tether material itself (continuous or discontinuous pattern such as bands or stripes). Depending upon application conditions, some users may prefer a few bands of 100 mm length spaced about a meter apart along the portion of the tether immediately adjacent the projectile. Another alternative is the provision of one or more full-length conspicuity markers on the deployed tether.

Ideally, the conspicuity marker(s) should be easily visible at distances of 10–30 meters in daylight or in low light levels under the illumination of a incandescent-bulb flashlight or portable laser illuminator. Alternatively other narrow-beam illumination sources such as UV or IR may be used with wavelength-responsive matching responsive markers and special viewing masks/goggles, analogous to night-view scopes or image-intensifiers, which are also well known.

Additional technical specifics of the local illumination (intensity, wavelength of ambient or focussed probe beam) and the marker (emission, reflection, etc.)are indicated in paragraphs below.

12,5,1 Distinctive Colors. There are many types of distinctive colors, e.g., red, orange, already in use for safety markings on equipment, vehicles, clothing, building exits and similar applications; any of these can be advantageously applied to the projectile or the tether line. It is anticipated that distinctive marking of the distal portion of the tether in the form of: a marked zone portion, or selected portions provided with transverse bands or longitudinal stripes may be highly desirable. The terminology distinctive colors as used herein means any conspicuous color which attracts the attention of a human viewer in normal or low light levels as well as in darkness. Color conspicuity may be achieved by means of reflective or emissive components into the surface region of a part, a paint film, an adhesive label or an attached device.

12,5,2 Radiation-Reflecting Films/Coatings/Devices. There are many well-known reflective or refractive finishes, tapes, patches, labels and devices already in use for safety markings on equipment, vehicles, clothing, building exits and similar applications; any of these can be advantageously applied to the projectile or the tether line.

12,5,3 Radiation-Emitting Films/Coatings/Devices. There are many well-known photoluminescent products such as pigments that can be incorporated into paint, plastic films, vitreous enamels, and flexible and molded or extruded plastics. Radioluminescent materials may be applied as liquid coating or as a film or labeling tape. Typical marking products include adhesive vinyl tapes, rigid PVC marker strips, and silk-screened plastic signage. Photoluminescent coatings are also commercially available for metal and ceramic devices and components. Radiation-emitting markers may operate by one or more well-known physical phenomena including fluorescence (light or radiation is emitted when an object is excited by light and the emitted light may be of a different color, but the emitted light stops shortly (as quickly as pico-seconds) after the exciting light is not available) and phosphorescence (light or radiation continues to be emitted for seconds to hours after the excitation stops). These phenomena include photoluminescence (electromagnetic radiation), cathodoluminescence (electrons), electroluminescence (stationary or varying electric fields), chemiluminescence (chemical reactions), bioluminescence (biological processes), sonoluminescence (acoustic energy), thermoluminescence (temperature changes), radioluminescence (subatomic particles), and triboluminescence (mechanical energy). The special projectile and line marker effects include any emission of light not ascribable directly to incandescence. Generally, phosphors are understood to be: luminescent materials which may be divided into two general groups. The first group (mostly organic materials) have molecules which upon absorbing excitation energy, molecules enter an excited energy state, and emit radiation as they return to a lower state. The second group (mostly inorganic compounds) derive their luminescence from perturbations in their crystal lattice structure or the presence of foreign atoms (called activators). The activators may become ionized, and release their energy when the free electrons combine with the ionized atoms. Typical inorganic materials are sulfides, oxides, silicates or phosphates of metals such as zinc, calcium, magnesium, cadmium, tungsten, and zirconium. Small amounts (0.01 to 1.0 percent) of metal impurities are added as activators. As in the case of distinctive colors described above, radiation-emitting molecules may the added to bulk polymers, applied as surface films/coatings or attached in the form of devices. Similarly, it is envisioned that markers may be applied to selected portions of the projectile or tether and/or in selected patterns (see 12,5,1 above).

One current source of state-of-the-art information on paint-type coatings is "Paint and Surface Coatings. Theory and Practice", Edited by R. Lambourne and T. A. Strivens, ISBN 1-884207-73-1 Second Ed. 1999. Properties and testing of such markers is described by the comprehensive DIN 67 510, "Phosphorescent Pigments and Products". Both of these references, as well as all relevant US Standards (ASTM, SAE, etc.) are well known to workers in this field and are referenced to define a typical source for current technology.

12,5,4 Reflective, Reflex-Reflective and Retroreflective Polymer Additives, Coatings, Labels and Devices for Projectile and/or Tether. Many commercial and safety standards already exist for reflective-type surfaces including ASTM, SAE, CIE (Commission Internationale de L'Éclairage) and IES (Illuminating Engineering Society).

Allard's Law, which is well known, governs the light-reflection between reflector and the incident beam, taking into account: incidence angle, area, distance, specific reflective intensity and environment/atmosphere transmissivity. From modern measurements of the sensitivity of the human eye it is also known that the threshold of visibility is in the range $2.3 \times 10^{-8}$ to $2.3 \times 10^{-6}$ footcandles. Therefore, for the present invention, the light reflected back toward the user or viewer from a reflective or emissive marker must be in this range or preferrably higher. Generally, a bright reflective marker for the projectile or tether should have an overall reflective intensitivity in the range 20–100 cd/footcandle.

12,6 Embodiments with Size Scaling and/or Accessory Features 12,6,1 Scaled Design Embodiments and Method. By using the OD of the free compression element as the key dimensional scaling factor it is possible to prepare embodiments of the present invention of different sizes which perform in a manner similar to the original sizes which have been tested. An example of the design-sizing calculation is the following: (a) the scaling factor listed in the rightmost column of Table 1 for L2, the length of the main dart portion is given as 14.15, (b) the new version is to be scaled to a dart with D30.3 of 9.59 mm (which is larger than the typical value of 7.67 mm given in the third column of Table 1) and (c) then, L2 for the new larger design will be (9.59)(14.15)= 135.7 mm. This principle can also be used to scale clearance gaps and the part-axis tolerances such as the TC50 circle which controls the proper fit and alignment of interacting components such as the dart, guide ribs, release element pivot axis location. Blank or (NA) in the scaling parameter generally means that the denoted characteristic may be modulated independently of D30.3; in the case of the spring constant a percent range of the parameter, whose dimensions are not a pure length.

12,6,2 Projectile embodiments including ballast and position-marker signal devices. For ease of detection the projectile of this invention may be prepared with a known signal device integrated or attached. For such devices which add significant weight, the device is a ballast element also contributes to the aerodynamic flight characteristics of the projectile. Packaged signal devices added to the projectile exhibit the following characteristics: (a) package physical volume 10 to 100 mm3, (b) package mass 0.2 to 100 g, (c) emitted electromagnetic signal is one of gamma, beta, audio, visible, UV, IR, radio, RF, (d) for human-audible and human-visible signals the signal strength must be sufficient to allow easy detection under room conditions at distances of 10 m by persons with normal hearing sensitivity range, (e) for non-human detectable signals, the strength must be sufficient to allow detection at a distance of 10 m with typical commercial technics and equipment.

12,6,3 Conductive tether characteristics. Embodiments provided with monofilament or multistrand tethers which allow conduction of electromagnetic radiation along its length from the launch point to the target location are prepared with known flexible, strong filaments including metals, alloys, and transparent glass, ceramics and polymers. Applications for such tethers are the establishment of a conductive link to a remote point or providing an antenna line for a radio or short-wave broadcast. Tethers in this class exhibit the following characteristics: (a) sp. gravity in the range 1 to about 5, (b) diameter of filament, yarn or tow in the range 0.3 to 1 mm, (c) rupture strength sufficient to support a force of at least 1N and sufficient flexibility under elastic bending to permit repeated coiling/winding/unwinding from a coil or spool of 100 to 1000 mm diameter. The type of conductivity is one of the following: electrical current, IR, UV, visible light. The resistance of a 25-meter length of selected, radiation-appropriate tether shall be sufficiently low that the radiation intensity or voltage is not attenuated, at useful flux or current levels, by more than 1/e after travel through a length of 25 meters.

12,6,4 Projectile flight-path tracer embodiments. For certain cable-pulling projects an embodiment which release a conspicuous, colored powder or liquid marker substance with a distinctive color or luminescent property is desirable. The tracer substance, which is delivered by a package attached to the projectile, must be easily detected in the environment by human users. The marker substances are released in sufficient amounts as fast-settling powder particles/droplets as the projectile travels from the launch point. By an appropriate light or laser illuminator the user can locate the trace of the path as a trail of tracer particles on surfaces located below the projectile path. The tracer is in the form of solid particles of one or more materials in the diameter range 25 to 200 micrometer, miniature powder-dispenser packages technics include pressurized propellant, vibratory and mechanical release. Liquid tracers are delivered by means of a pressurized container with an orifice which produces droplets in the diameter range 25 to 200 micrometer, the liquid may a propellant-marker particle suspension. The total amount of tracer delivered is sufficient to provide an easily visible 10 to 200 mm wide "trace" of dispersed particles over a distance of about 10–20 m. Generally the tracer-delivery packages, including contained marker materials, are similar in volume and weight to signal devices described above. As with signal devices and ballast, the tracer pack is also attached to the distal portion of the projectile.

What is claimed is:

1. An apparatus for laying a flexible line comprising:
   a) a portable launcher and a projectile associated with the launcher; the portable launcher including a barrel to guide launching of the projectile via release from a potential energy storage device;
   b) the flexible line being a tether line contained at least partially in a line store located on the launcher; wherein one end of the tether line is secured to the projectile and the other end of the tether line is contained in the line store; wherein release of the potential energy storage device launches the projectile through the barrel and across an intervening space toward a target; where an object attachable to the projectile or the tether line can be retrieved by retracting the tether line;
   c) the potential energy storage device including a compressible element attached to a generally U-shaped release element having first and second upstanding limbs and a base portion including a trigger element, wherein a flange on proximal portion of the projectile is engageable and releasable by the release element;
   d) the barrel including a plurality of longitudinal guide ribs in spaced apart configuration, with each said rib terminating in a rounded end portion, said ribs providing guidance for the projectile when the projectile travels through the barrel, and
   e) wherein the release element is pivotally mounted on the launcher and is capable of limited pivotal movement in response to actuation of the trigger element.

2. An apparatus for laying a flexible line as claimed in claim 1, wherein the apparatus further comprises a plurality of axially spaced flanges on the projectile for engagement and release by the second limb of the release element.

3. An apparatus for laying a flexible line as claimed in claim 1, wherein the apparatus further comprises a coil spring as the compressible element and a retention means adapted to couple the proximal end of the spring to the release element.

4. An apparatus for laying a flexible line as claimed in claim 1, wherein the line store is a spinning reel, the compressible element is a spinning and the attachment is a retention coupling between the proximal portion of the release element and the abutting coils of the spring.

5. An apparatus for laying a flexible line as claimed in claim 1, wherein the tether line is a synthetic polymer selected from the group consisting of a monofilament line, a braided multifilament line, and a twisted multifilament line.

6. An apparatus for laying a flexible line as claimed in claim 1, wherein the apparatus further comprises an aiming device mounted on the barrel for determining a line of sight across the intervening space, wherein the aiming device is selected from the group consisting of an optical view finder, an optical range finder, a flashlight, and a visible laser.

7. An apparatus for laying a flexible line as claimed in claim 1, wherein a pivot point of the release element is located below the longitudinal axis of the barrel.

8. An apparatus for laying a flexible line as claimed in claim 1, wherein the launcher is a hand-held and operated device.

9. An apparatus for laying a flexible line as claimed in claim 1, wherein the apparatus further comprises an aiming device mounted on an upper portion of the launcher for determining a line of sight, wherein the aiming device is selected from the group consisting of an optical view finder, an optical range finder, a flashlight, and a visible laser.

10. An apparatus for laying a flexible line comprising:
    a) a portable launcher and a projectile associated with the launcher; the portable launcher including a barrel to guide launching of the projectile via release from a potential energy storage device;
    b) the flexible line being a tether line contained at least partially in a line store located on the launcher; wherein one end of the tether line is secured to the projectile and the other end of the tether line is contained in the line store; wherein release of the potential energy storage device launches the projectile through the barrel and across an intervening space toward a target; where an object attachable to the projectile or the tether line can be retrieved by retracting the tether line;
    c) the potential energy storage device including a compressible element attached to a generally U-shaped release element having first and second upstanding limbs and a base portion including a trigger element, wherein a flange on proximal portion of the projectile is engageable and releasable by the release element;
    d) the barrel including a plurality of longitudinal guide ribs in spaced apart configuration, with each said rib terminating in a rounded end portion, said ribs providing guidance for the projectile when the projectile travels through the barrel;
    e) the release element further being provided with a safety device to prevent movement and accidental release of a loaded projectile; and
    f) wherein the portable launcher includes a handle for aiming the launcher, and the projectile includes containment means for containing the tether line after the tether line is attached to the projectile, whereby interference between the tether line and adjacent features is avoided during projectile loading or release.

11. An apparatus for laying a flexible line as claimed in claim 10, wherein the containment means includes axial recesses on the projectile exterior, while the flange is provided with notches adapted to receive the tether line.

12. An apparatus for laying a flexible line as claimed in claim 10, wherein the containment means of the projectile includes at least one of: a passageway with an axial hole and a radial hole for receiving the tether line.

* * * * *